(12) United States Patent
Wieckowski et al.

(10) Patent No.: US 12,192,461 B2
(45) Date of Patent: Jan. 7, 2025

(54) APPARATUS AND METHOD FOR ENCODING AND DECODING A PICTURE USING PICTURE BOUNDARY HANDLING

(71) Applicant: Fraunhofer-Gesellschaft zur Förderung derangewandten Forschung e.V., Munich (DE)

(72) Inventors: Adam Wieckowski, Berlin (DE); Valeri George, Berlin (DE); Tobias Hinz, Berlin (DE); Heiko Schwarz, Berlin (DE); Detlev Marpe, Berlin (DE); Thomas Wiegand, Berlin (DE); Jackie Ma, Berlin (DE); Jens Brandenburg, Berlin (DE)

(73) Assignee: Fraunhofer-Gesellschaft zur Förderung derangewandten Forschung e.V., Munich (DE)

( * ) Notice: Subject to any disclaimer, the term of this patent is extended or adjusted under 35 U.S.C. 154(b) by 0 days.

(21) Appl. No.: 18/499,954

(22) Filed: Nov. 1, 2023

(65) Prior Publication Data

US 2024/0064300 A1    Feb. 22, 2024

Related U.S. Application Data

(63) Continuation of application No. 17/480,024, filed on Sep. 20, 2021, now Pat. No. 11,843,774, which is a
(Continued)

(30) Foreign Application Priority Data

Mar. 29, 2018    (EP) ..................... 18165218

(51) Int. Cl.
*H04N 19/119*    (2014.01)
*H04N 19/103*    (2014.01)
(Continued)

(52) U.S. Cl.
CPC ......... *H04N 19/119* (2014.11); *H04N 19/103* (2014.11); *H04N 19/176* (2014.11);
(Continued)

(58) Field of Classification Search
CPC .. H04N 19/119; H04N 19/103; H04N 19/176; H04N 19/1883; H04N 19/192; H04N 19/96; H04N 19/167
See application file for complete search history.

(56) References Cited

U.S. PATENT DOCUMENTS

| 2016/0373766 A1 | 12/2016 | Fuldseth |
| 2017/0347123 A1 | 11/2017 | Panusopone |
| 2020/0077094 A1* | 3/2020 | Poirier ................. H04N 19/176 |

FOREIGN PATENT DOCUMENTS

| KR | 20110047697 A | 5/2011 |
| WO | 2017157249 A1 | 9/2017 |
| WO | 2019077751 A1 | 11/2020 |

OTHER PUBLICATIONS

Yang, Fuzheng, et al., "CTB Splitting on Frame Boundary for Arbitrary Resolution Video", JCTVC-C025, 3rd Meeting: 3hangzhou, China, Oct. 7-15, 2020.
(Continued)

*Primary Examiner* — Nam D Pham
(74) *Attorney, Agent, or Firm* — Conley Rose, P.C.

(57) ABSTRACT

The present invention concerns an apparatus configured to partition a picture into leaf blocks using recursive multi-tree partitioning, block-based encode the picture into a data stream using the partitioning of the picture into the leaf blocks, wherein the apparatus is configured to, in partitioning the picture into the leaf blocks, for a predetermined block which extends beyond a boundary of the picture, reduce an available set of split modes depending on a position at which the boundary of the picture crosses the predetermined block in order to obtain a reduced set of one
(Continued)

or more split modes, wherein the apparatus is configured to signal a selected split mode in the data stream.

19 Claims, 12 Drawing Sheets

Related U.S. Application Data continuation of application No. 17/033,214, filed on Sep. 25, 2020, now Pat. No. 11,146,789, which is a continuation of application No. PCT/EP2019/057170, filed on Mar. 21, 2019.

(51) Int. Cl.
  *H04N 19/169* (2014.01)
  *H04N 19/176* (2014.01)
  *H04N 19/192* (2014.01)
  *H04N 19/96* (2014.01)

(52) U.S. Cl.
  CPC ....... *H04N 19/1883* (2014.11); *H04N 19/192* (2014.11); *H04N 19/96* (2014.11)

(56) References Cited

OTHER PUBLICATIONS

Chen, J, et al., "Algorithm Description of Joint Exploration Test Model 6 (JEM 6)", JVET, doc. JVET-F1001.

ITU-T and ISO/IEC, "High efficiency video coding", ITU-T Recommendation H.265 IISO/IEC 23008 10 (HEVC), edition 1, 2013; edition 2, 2014.

Le LeAnnec, F, et al., "Asymmetric Coding Units in QTBT", JVET, doc. JVET-D0064.

Li, X, et al., "Multi-Type-Tree", JVET, doc. JVET-D0117.

\* cited by examiner

APPARATUS AND METHOD FOR ENCODING AND DECODING A PICTURE USING PICTURE BOUNDARY HANDLING

CROSS-REFERENCE TO RELATED APPLICATIONS

This application is a continuation of co-pending U.S. patent application Ser. No. 17/480,024 filed Sep. 20, 2021, which is a continuation U.S. patent application Ser. No. 17/033,214 filed Sep. 25, 2020, which is a continuation of International Application No. PCT/EP2019/057170, filed Mar. 21, 2019, which is incorporated herein by reference in its entirety, and additionally claims priority from European Application No. 18165218.1, filed Mar. 29, 2018, which is also incorporated herein by reference in its entirety.

BACKGROUND OF THE INVENTION

The present invention is concerned with picture and video coding. Embodiments of the present invention are concerned with a particular way of partitioning input picture and video data of a specific size into smaller entities. In particular, embodiments of the present invention are concerned with picture boundary handling in recursive picture signal partitioning.

In modern video coding applications, the input video signal of a specific size is partitioned into smaller chunks [1]. This partitioning consists of multiple structures with specific information and description associated with each level. In the state of the art video codec H.265/HEVC [1], the most important subdivision is the subdivision into macroblocks. Those macroblocks, or coding tree units, are quadratic structures of a predefined size spanning a fixed grid over the coded picture. All other partitioning levels are defined in terms of this rigid subdivision. E.g., the more coarse high level partitioning into slices and tiles is defined in terms of the included CTUs.

In H.265/HEVC [1], starting at each CTU, a quad-tree structure is signaled providing means of recursively partitioning a rigid CTU into flexible sub-structures. At each level, in a defined parameter scope, it is inferred or signaled a block that should be split into four sub-blocks or coded at the specified level. This process is repeated recursively until no further split is possible as defined by current high-level parameters or a flag is read indicating that no further split should be performed at the current level. In this case, signaling of a coding unit and its sub-structures will be read.

The signaling of a quad-tree split can sometimes be omitted and inferred as either true or false. Most notably, due the rigid nature, CTUs are not necessarily aligned with video picture boundaries. In this case, if a CTU or a sub-block in the quad-tree partitioning structure is not fully contained in the picture boundaries, a split flag will be inferred as positive without explicit signaling. If, after the split, a sub-block lies completely outside of the video picture boundaries, no further signaling for this block will be read.

In the development of a future video standard with capabilities beyond H.265/HEVC [1], the quad-tree recursive splitting structure is extended by different split configurations [2]. If a block is not split into four quadratic sub-parts, a binary split is signaled indicating that this block should be split into two rectangular blocks using a split ratio of %. The signaling also includes the information if the split should be applied horizontally or vertically. Such rectangular blocks can be further recursively split into smaller quadratic or rectangular blocks using the binary tree split syntax. This enhanced split-tree is called QTBT [2]. QTBT handles picture boundaries using the implicit quad-split, exactly as in the H.265/HEVC standard [1]. In QTBT, if a block exceeds the picture boundaries, a quadsplit will be inferred and no signaling will be read.

In [5], a novel partitioning method is described, Generalized Binary Splitting, which might not contain a quad-split but might also be used together with a quad split. In this method the binary split can be signaled to perform the split with a split ratio other than 1/2. The splits might also be signaled using a syntax relative to the previous split.

However, the conventional partitioning methods are rather rigid in the handling of picture boundaries. As explained above, conventional partitioning methods may use an implicit quad split at picture boundaries. That is, the known technology uses a fully implicit split derivation at a picture boundary. Such implicit signaling may enable a good signaling efficiency. However, this may only provide for a low flexibility.

Thus, it is an object of the present invention to enhance existing partitioning methods to be more flexible in picture boundary handling and, at the same time, to reduce the bit budget for signaling the picture boundary handling.

SUMMARY

An embodiment may have an apparatus for encoding a picture, configured to partition the picture into leaf blocks using recursive multi-tree partitioning, block-based encode the picture into a data stream using the partitioning of the picture into the leaf blocks, wherein the apparatus is configured to, in partitioning the picture into the leaf blocks, for a predetermined block that corresponds to a predetermined tree level of the multi-tree partitioning and which extends beyond a boundary of the picture, reduce an available set of split modes for splitting the predetermined block depending on a position at which the boundary of the picture crosses the predetermined block in order to obtain a reduced set of one or more split modes, wherein, if a cardinality of the reduced set is one, the apparatus is configured to apply the split mode of the reduced set for splitting the predetermined block, and if a cardinality of the reduced set is greater than one, the apparatus is configured to select one of the split modes of the reduced set and to apply the selected one of the split modes for splitting the predetermined block and to signal the selection in the data stream.

Another embodiment may have an apparatus for decoding a picture, configured to partition the picture into leaf blocks using recursive multi-tree partitioning, block-based decode the picture from a data stream using the partitioning of the picture into leaf blocks, wherein the apparatus is configured to, in partitioning the picture into the leaf blocks, for a predetermined block that corresponds to a predetermined tree level of the multi-tree partitioning and which extends beyond a boundary of the picture, reduce an available set of split modes for splitting the predetermined block depending on a position at which the picture boundary crosses the predetermined block to obtain a reduced set of one or more split modes, wherein if a cardinality of the reduced set is one, the apparatus is configured to apply the split mode of the reduced set for splitting the predetermined block, and if a cardinality of the reduced set is greater than one, the apparatus is configured to select one of the split modes of the reduced set and to apply the selected one of the split modes for splitting the predetermined block according to a signalization in the data stream.

According to another embodiment, a method for encoding a picture may have the steps of: partitioning the picture into leaf blocks using recursive multi-tree partitioning, block-based encoding the picture into a data stream using the partitioning of the picture into the leaf blocks, wherein the method further comprises the steps of, in partitioning the picture into the leaf blocks, for a predetermined block that corresponds to a predetermined tree level of the multi-tree partitioning and which extends beyond a boundary of the picture, reducing an available set of split modes for splitting the predetermined block depending on a position at which the picture boundary crosses the predetermined block in order to obtain a reduced set of one or more split modes, wherein if a cardinality of the reduced set is one, the method comprises a step of applying the split mode of the reduced set for splitting the predetermined block, and if a cardinality of the reduced set is greater than one, the method comprising a step of selecting one of the split modes of the reduced set and applying the selected one of the split modes for splitting the predetermined block and signaling the selection in the data stream.

According to still another embodiment, a method for decoding a picture may have the steps of: partitioning the picture into leaf blocks using recursive multi-tree partitioning, block-based decoding the picture from a data stream using the partitioning of the picture into leaf blocks, wherein the method further comprises the steps of, in partitioning the picture into the leaf blocks, for a predetermined block, which corresponds to a predetermined tree level of the multi-tree partitioning and which extends beyond a boundary of the picture, reducing an available set of split modes for splitting the predetermined block depending on a position at which the picture boundary crosses the predetermined block in order to obtain a reduced set of one or more split modes, wherein if a cardinality of the reduced set is one, the method comprises a further step of applying the split mode of the reduced set for splitting the predetermined block, and if a cardinality of the reduced set is greater than one, the method comprising the further step of selecting one of the split modes of the reduced set and applying the selected one of the split modes for splitting the predetermined block according to a signalization in the data stream.

Another embodiment may have a non-transitory digital storage medium having stored thereon a computer program for performing a method for encoding a picture, the method comprising the steps of partitioning the picture into leaf blocks using recursive multi-tree partitioning, block-based encoding the picture into a data stream using the partitioning of the picture into the leaf blocks, wherein the method further comprises the steps of, in partitioning the picture into the leaf blocks, for a predetermined block that corresponds to a predetermined tree level of the multi-tree partitioning and which extends beyond a boundary of the picture, reducing an available set of split modes for splitting the predetermined block depending on a position at which the picture boundary crosses the predetermined block in order to obtain a reduced set of one or more split modes, wherein if a cardinality of the reduced set is one, the method comprises a step of applying the split mode of the reduced set for splitting the predetermined block, and if a cardinality of the reduced set is greater than one, the method comprising a step of selecting one of the split modes of the reduced set and applying the selected one of the split modes for splitting the predetermined block and signaling the selection in the data stream, when said computer program is run by a computer.

Another embodiment may have a non-transitory digital storage medium having stored thereon a computer program for performing a method for decoding a picture, the method comprising the steps of partitioning the picture into leaf blocks using recursive multi-tree partitioning, block-based decoding the picture from a data stream using the partitioning of the picture into leaf blocks, wherein the method further comprises the steps of, in partitioning the picture into the leaf blocks, for a predetermined block, which corresponds to a predetermined tree level of the multi-tree partitioning and which extends beyond a boundary of the picture, reducing an available set of split modes for splitting the predetermined block depending on a position at which the picture boundary crosses the predetermined block in order to obtain a reduced set of one or more split modes, wherein if a cardinality of the reduced set is one, the method comprises a further step of applying the split mode of the reduced set for splitting the predetermined block, and if a cardinality of the reduced set is greater than one, the method comprising the further step of selecting one of the split modes of the reduced set and applying the selected one of the split modes for splitting the predetermined block according to a signalization in the data stream, when said computer program is run by a computer.

Still another embodiment may have a data stream obtained by the above inventive method of encoding.

Another embodiment may have a data stream obtained by the above inventive method of decoding.

A first aspect concerns an apparatus for encoding a picture. The apparatus is configured to partition the picture into leaf blocks using a recursive multi-tree partitioning. That is, the apparatus is configured to partition the picture into smaller chunks using said recursive multi-tree partitioning. Said smaller chunks may be blocks of a certain size. By stepping through the multi-tree, the partitioning of the picture may start from a tree-root block at a first level and it may end up at a leaf block, which is the last block of the multi-tree and thus the smallest entity of the partitioning. Between the tree-root block and the partitioned leaf block, the apparatus may step-by-step go from one partitioning tree level to one or more subsequent partitioning tree levels, wherein at each tree level the current block at the particular tree level is partitioned into two or more smaller blocks. For example in HEVC, the tree-root blocks may be so-called macroblocks or Coding Tree Units, and the leaf blocks may be so-called subblocks or Coding Unit. Accordingly, a CTU may be partitioned into one or more CUs, wherein a leaf block or any block at a tree level between the tree-root block and the leaf block may be referred to as a subblock. Furthermore, in the present disclosure, a tree-root block, or a leaf block, or any block at a tree level between the tree-root block and the leaf block may be referred to as a predetermined block. Accordingly, a predetermined block may correspond to a predetermined tree level of the multi-tree partitioning. The apparatus may exploit a block-based coding scheme, i.e. the apparatus is configured to block-based encode the picture into a data stream by using the partitioning of the picture into the leaf blocks. The partitioning may also be referred to as splitting. The partitioning of the tree-root blocks into the smaller leaf blocks may use a certain splitting scheme for splitting blocks into smaller subblocks. These splitting schemes may also be referred to as split modes which may vary at each tree level. Furthermore, the predetermined blocks may comprise a predetermined size. When arranging the predetermined blocks as a grid over the picture, it may happen that some of the predetermined blocks, due to its size, may extend over a picture boundary. For example, a first portion of a predetermined block may be located inside the picture while a second portion of said predetermined block may be located outside the picture. Accordingly, the picture boundary may cross the predetermined block. Generally, the picture boundary may cross predetermined blocks at different positions. For example, the picture boundary may cross a predetermined block horizontally, or vertically, or both wherein the picture corner will be contained in the predetermined block. For handling these situations, the present invention provides the following solution. While partitioning the picture into the leaf blocks, the apparatus is configured to partition a predetermined block that corresponds to a predetermined tree level of the multi-tree partitioning and which extends beyond a boundary of the picture, by using a reduced set of split modes compared to fully implicit split derivation as used by the known technology. According to the invention, the apparatus is configured to reduce an available set of split modes for splitting the predetermined block depending on the above mentioned position at which the picture boundary crosses said predetermined block. Thus, the apparatus obtains a reduced set of one or more split modes. The reduced set may comprise a cardinality which indicates the number of split modes being available in the reduced set of split modes. Accordingly, if a cardinality of the reduced set is one, i.e. if the reduced set comprises only one split mode, the apparatus is configured to apply this split mode of the reduced set for splitting the predetermined block. If a cardinality of the reduced set is greater than one, i.e. if the reduced set comprises two or more different split modes, the apparatus is configured to select one of these split modes of the reduced set and to apply the selected one of the split modes for splitting the predetermined block, wherein the apparatus signals its respective selection in the data stream. In other words, the inventive apparatus may pre-select a reduced set of split modes for splitting a current predetermined block. Said pre-selection may depend on the current position of the block relative to the picture boundary. In result, the inventive apparatus may only have to choose a suitable split mode from a pre-selected reduced set of split modes. This reduces the bit budget for signaling the selected split mode in the data stream because, no information about splitting itself needs to be transferred, and if the reduced split set comprises more than one split mode, only the remaining uncertainty may have to be signaled, e.g. by one bin.

A second aspect concerns an apparatus for decoding a picture. The apparatus is configured to partition the picture into leaf blocks using recursive multi-tree partitioning. The apparatus is further configured to block-based decode the picture from a data stream using the partitioning of the picture into leaf blocks. The apparatus is further configured to, in partitioning the picture into the leaf blocks, for a predetermined block that corresponds to a predetermined tree level of the multi-tree partitioning and that extends beyond a boundary of the picture, reduce an available set of split modes for splitting the predetermined block depending on a position at which the boundary crosses the predetermined block to obtain a reduced set of one or more split modes. If a cardinality of the reduced set is one, the apparatus is configured to apply the split mode of the reduced set for splitting the predetermined block, and if a cardinality of the reduced set is greater than one, the apparatus is configured to select one of the split modes of the reduced set and to apply the selected one of the split modes for splitting the predetermined block according to a signalization in the data stream. As to the advantages of said apparatus for decoding a picture it is referred to the passage above describing the advantages of the apparatus for encoding a picture.

A third aspect concerns a method for encoding a picture, the method comprising a step of partitioning the picture into leaf blocks using recursive multi-tree partitioning. The method further comprises a step of block-based encoding the picture into a data stream using the partitioning of the picture into the leaf blocks. The method further comprises the steps of, in partitioning the picture into the leaf blocks, for a predetermined block that corresponds to a predetermined tree level of the multi-tree partitioning and which extends beyond a boundary of the picture, reducing an available set of split modes for splitting the predetermined block depending on a position at which the boundary crosses the predetermined block to obtain a reduced set of one or more split modes. If a cardinality of the reduced set is one, the method comprises a step of applying the split mode of the reduced set for splitting the predetermined block, and if a cardinality of the reduced set is greater than one, the method comprising a step of selecting one of the split modes of the reduced set and applying the selected one of the split modes for splitting the predetermined block and signaling the selection in the data stream. As to the advantages of said method for encoding a picture it is referred to the passage above describing the advantages of the apparatus for encoding a picture.

A fourth aspect concerns a method for decoding a picture, the method comprising a step of partitioning the picture into leaf blocks using recursive multi-tree partitioning. The method further comprises a step of block-based decoding the picture from a data stream using the partitioning of the picture into leaf blocks. The method further comprises the steps of, in partitioning the picture into the leaf blocks, for a predetermined block that corresponds to a predetermined tree level of the multi-tree partitioning and which extends beyond a boundary of the picture, reducing an available set of split modes for splitting the predetermined block depending on a position at which the boundary crosses the predetermined block to obtain a reduced set of one or more split modes. If a cardinality of the reduced set is one, the method comprises a further step of applying the split mode of the reduced set for splitting the predetermined block, and if a cardinality of the reduced set is greater than one, the method comprising the further step of selecting one of the split modes of the reduced set and applying the selected one of the split modes for splitting the predetermined block according to a signalization in the data stream. As to the advantages of said method for decoding a picture it is referred to the passage above describing the advantages of the apparatus for encoding a picture.

According to a fifth aspect, computer programs are provided, wherein each of the computer programs is configured to implement the above-described method when being executed on a computer or signal processor, so that the above-described method is implemented by one of the computer programs.

BRIEF DESCRIPTION OF THE DRAWINGS

Embodiments of the present application will be exemplarily described below with respect to the figures, in which.

DETAILED DESCRIPTION OF THE INVENTION

Figure 1:
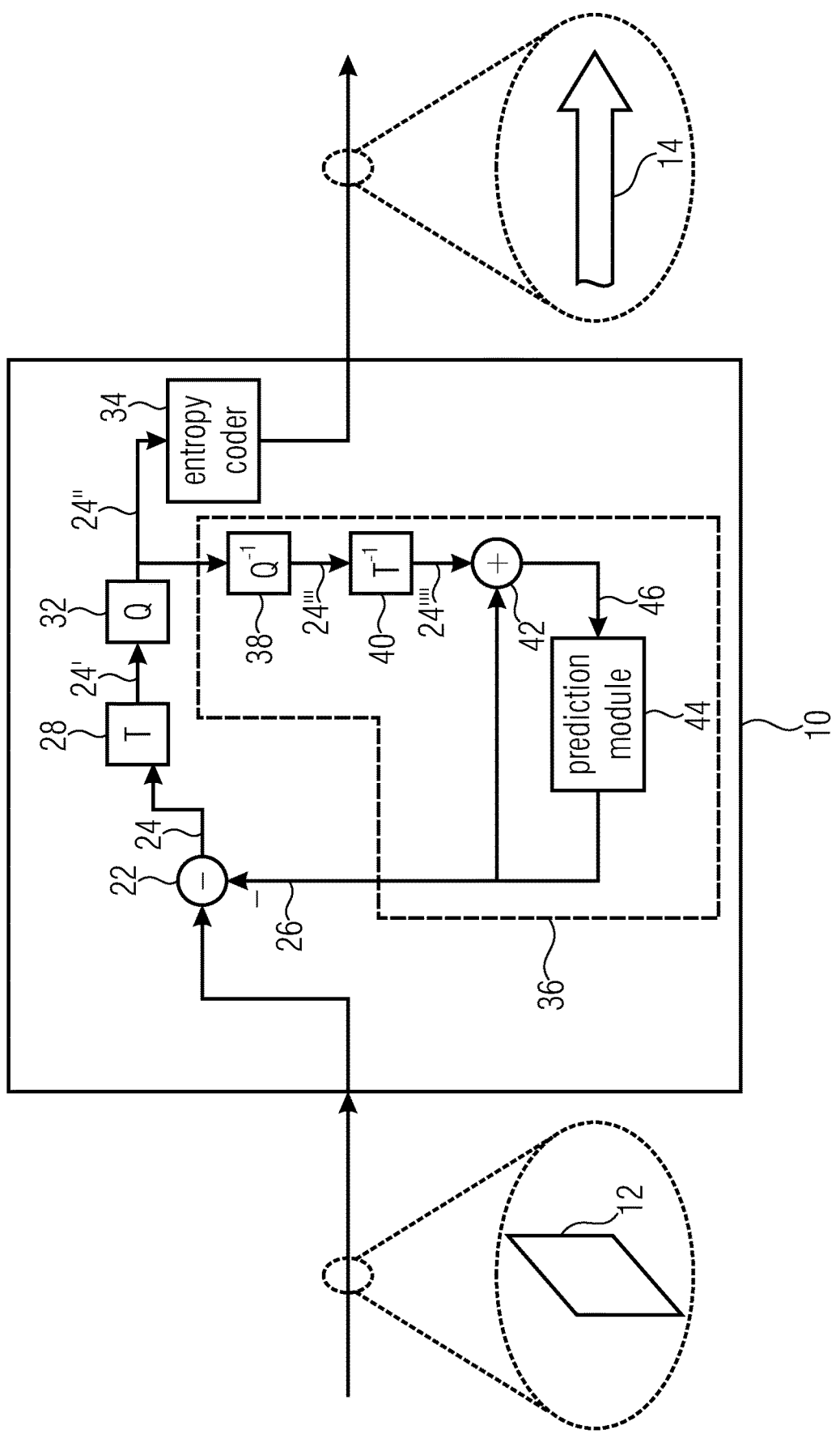
FIG. 1 shows a block diagram of an apparatus for predictively coding a picture as an example for an encoder where an intra prediction concept according to embodiments of the present application could be implemented.

Equal or equivalent elements or elements with equal or equivalent functionality are denoted in the following description by equal or equivalent reference numerals.

The following description of the Figures may only describe some of multiple illustrative and non-limiting examples and embodiments of the herein described concept. CTUs may be described as non-limiting examples of macroblocks, while CUs may be described as non-limiting examples of subblocks. Furthermore, a picture may be composed of e.g. multiple tiles, each representing an image themselves. In HEVC [1], such tiling, e.g. for omnidirectional video, is used and handled by the high level concept of picture tiles. Such tiling is available at CTU resolution. In case such a restriction is loosened, a "coded picture" might consist of multiple tiles, each with its own boundaries and with its own content. In that sense, a coded picture might contain more picture boundaries, with each tile constituting its own "picture data" with its own "picture data" boundaries, for which the same rules as described in this invention might apply. Accordingly, if the term "picture boundary" is used herein, this may also include a "current picture data boundary" belonging to, e.g. one or more tiles.

The following description of the figures starts with a presentation of a description of an encoder and a decoder of a block-based predictive codec for coding pictures of a video in order to form an example for a coding framework into which embodiments may be built in. The encoder and decoder are described with respect to FIGS. 1 to 3. Thereinafter the description of embodiments of the concept of the present application is presented along with a description as to how such concepts could be built into the encoder and decoder of FIGS. 1 and 2, respectively, although the embodiments described with the subsequent FIG. 4 and following, may also be used to form encoders and decoders not operating according to the coding framework underlying the encoder and decoder of FIGS. 1 and 2.

Figure 2:
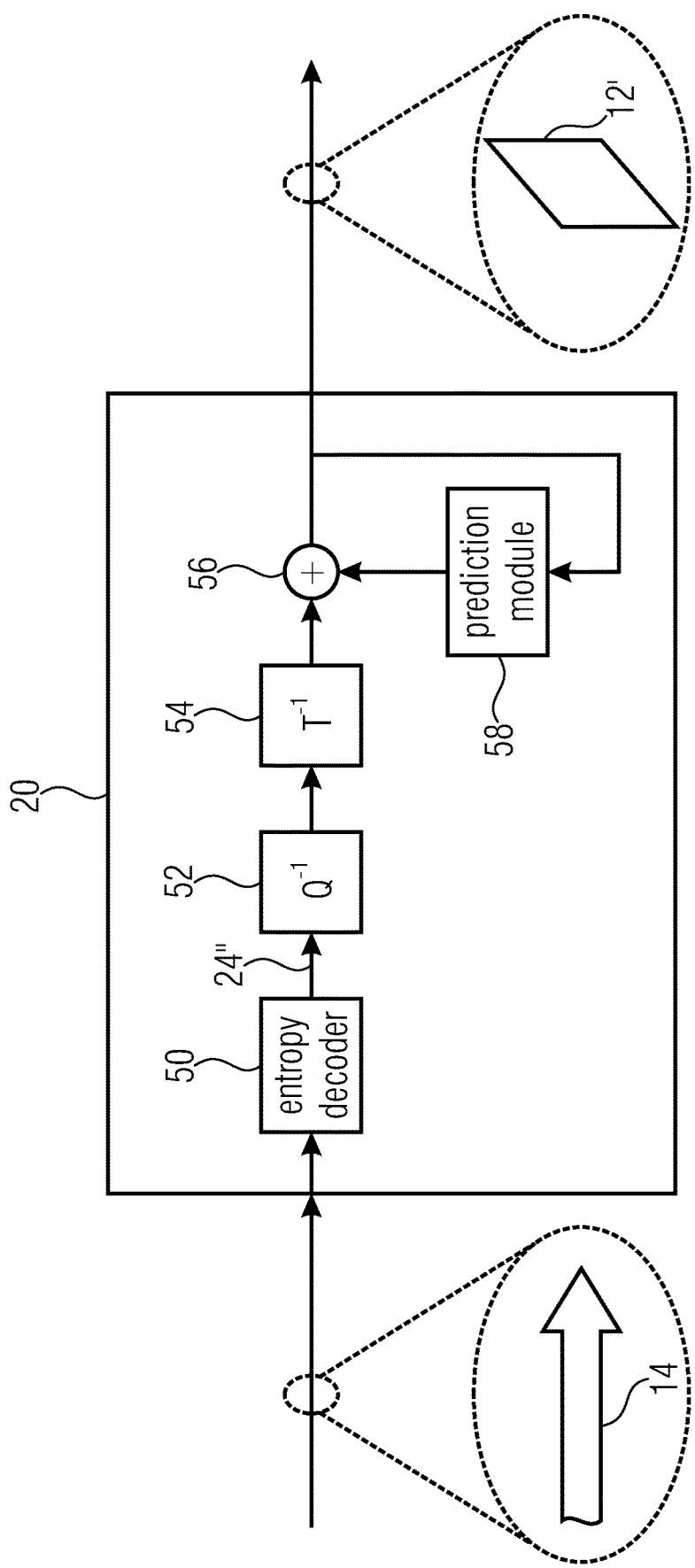
FIG. 2 shows a block diagram of an apparatus for predictively decoding a picture, which fits to the apparatus of FIG. 1, as an example for decoder where an intra prediction concept according to embodiments of the present application could be implemented.

FIG. 1 shows an apparatus for predictively coding a picture 12 into a data stream 14 exemplarily using transform-based residual coding. The apparatus for encoding, or encoder, is indicated using reference sign 10. FIG. 2 shows a corresponding apparatus for decoding, or a decoder 20, that may be an apparatus configured to predictively decode the picture 12' from the data stream 14 also using transform-based residual decoding, wherein the apostrophe has been used to indicate that the picture 12' as reconstructed by the decoder 20 may deviate from picture 12 originally encoded by apparatus 10 in terms of coding loss introduced by a quantization of the prediction residual signal. FIG. 1 and FIG. 2 exemplarily use transform based prediction residual coding, although embodiments of the present application are not restricted to this kind of prediction residual coding. This is true for other details described with respect to FIGS. 1 and 2, too, as will be outlined hereinafter.

The encoder 10 may be configured to subject the prediction residual signal to spatial-to-spectral transformation and to encode the prediction residual signal, thus obtained, into the data stream 14. Likewise, the decoder 20 may be configured to decode the prediction residual signal from the data stream 14 and subject the prediction residual signal thus obtained to spectral-to-spatial transformation.

Internally, the encoder 10 may comprise a prediction residual signal former 22 which generates a prediction residual 24 so as to measure a deviation of a prediction signal 26 from the original signal, i.e. from the picture 12. The prediction residual signal former 22 may, for instance, be a subtractor which subtracts the prediction signal from the original signal, i.e. from the picture 12. The encoder 10 then further comprises a transformer 28 which subjects the prediction residual signal 24 to a spatial-to-spectral transformation to obtain a spectral-domain prediction residual signal 24' which is then subject to quantization by a quantizer 32, also comprised by the encoder 10. The thus quantized prediction residual signal 24" is coded into bitstream 14. To this end, encoder 10 may optionally comprise an entropy coder 34 which entropy codes the prediction residual signal as transformed and quantized into data stream 14. The prediction residual 26 is generated by a prediction stage 36 of encoder 10 on the basis of the prediction residual signal 24" encoded into, and decodable from, data stream 14. To this end, the prediction stage 36 may internally, as is shown in FIG. 1, comprise a dequantizer 38 which dequantizes prediction residual signal 24" so as to gain spectral-domain prediction residual signal 24''', which corresponds to signal 24' except for quantization loss, followed by an inverse transformer which subjects the latter prediction residual signal 24''' to an inverse transformation, i.e. a spectral-to-spatial transformation, to obtain prediction residual signal 24'''', which corresponds to the original prediction residual signal 24 except for quantization loss. A combiner 42 of the prediction stage 36 then recombines, such as by addition, the prediction signal 26 and the prediction residual signal 24'''' so as to obtain a reconstructed signal 46, i.e. a reconstruction of the original signal 12. Reconstructed signal 46 may correspond to signal 12'. A prediction module 44 of prediction stage 36 then generates the prediction signal 26 on the basis of signal 46 by using, for instance, spatial prediction, i.e. intra prediction, and/or temporal prediction, i.e. inter prediction.

Likewise, decoder 20, as shown in FIG. 2, may be internally composed of components corresponding to, and interconnected in a manner corresponding to, prediction stage 36. In particular, entropy decoder 50 of decoder 20 may entropy decode the quantized spectral-domain prediction residual signal 24'' from the data stream, whereupon dequantizer 52, inverse transformer 54, combiner 56 and prediction module 58, interconnected and cooperating in the manner described above with respect to the modules of prediction stage 36, recover the reconstructed signal on the basis of prediction residual signal 24'' so that, as shown in FIG. 2, the output of combiner 56 results in the reconstructed signal, namely picture 12'.

Although not specifically described above, it is readily clear that the encoder 10 may set some coding parameters including, for instance, prediction modes, motion parameters and the like, according to some optimization scheme such as, for instance, in a manner optimizing some rate and distortion related criterion, i.e. coding cost. For example, encoder 10 and decoder 20 and the corresponding modules 44, 58, respectively, may support different prediction modes such as intra-coding modes and inter-coding modes. The granularity at which encoder and decoder switch between these prediction mode types may correspond to a subdivision of picture 12 and 12', respectively, into coding segments or coding blocks. In units of these coding segments, for instance, the picture may be subdivided into blocks being intra-coded and blocks being inter-coded. Intra-coded blocks are predicted on the basis of a spatial, already coded/decoded neighborhood of the respective block as is outlined in more detail below. Several intra-coding modes may exist and be selected for a respective intra-coded segment including directional or angular intra-coding modes according to which the respective segment is filled by extrapolating the sample values of the neighborhood along a certain direction which is specific for the respective directional intra-coding mode, into the respective intra-coded segment. The intra-coding modes may, for instance, also comprise one or more further modes such as a DC coding mode, according to which the prediction for the respective intra-coded block assigns a DC value to all samples within the respective intra-coded segment, and/or a planar intra-coding mode according to which the prediction of the respective block is approximated or determined to be a spatial distribution of sample values described by a two-dimensional linear function over the sample positions of the respective intra-coded block with driving tilt and offset of the plane defined by the two-dimensional linear function on the basis of the neighboring samples. Compared thereto, inter-coded blocks may be predicted, for instance, temporally. For inter-coded blocks, motion vectors may be signaled within the data stream, the motion vectors indicating the spatial displacement of the portion of a previously coded picture of the video to which picture 12 belongs, at which the previously coded/decoded picture is sampled in order to obtain the prediction signal for the respective inter-coded block. This means, in addition to the residual signal coding comprised by data stream 14, such as the entropy-coded transform coefficient levels representing the quantized spectral-domain prediction residual signal 24'', data stream 14 may have encoded thereinto coding mode parameters for assigning the coding modes to the various blocks, prediction parameters for some of the blocks, such as motion parameters for inter-coded segments, and optional further parameters such as parameters for controlling and signaling the subdivision of picture 12 and 12', respectively, into the segments. The decoder 20 uses these parameters to subdivide the picture in the same manner as the encoder did, to assign the same prediction modes to the segments, and to perform the same prediction to result in the same prediction signal.

Figure 3:
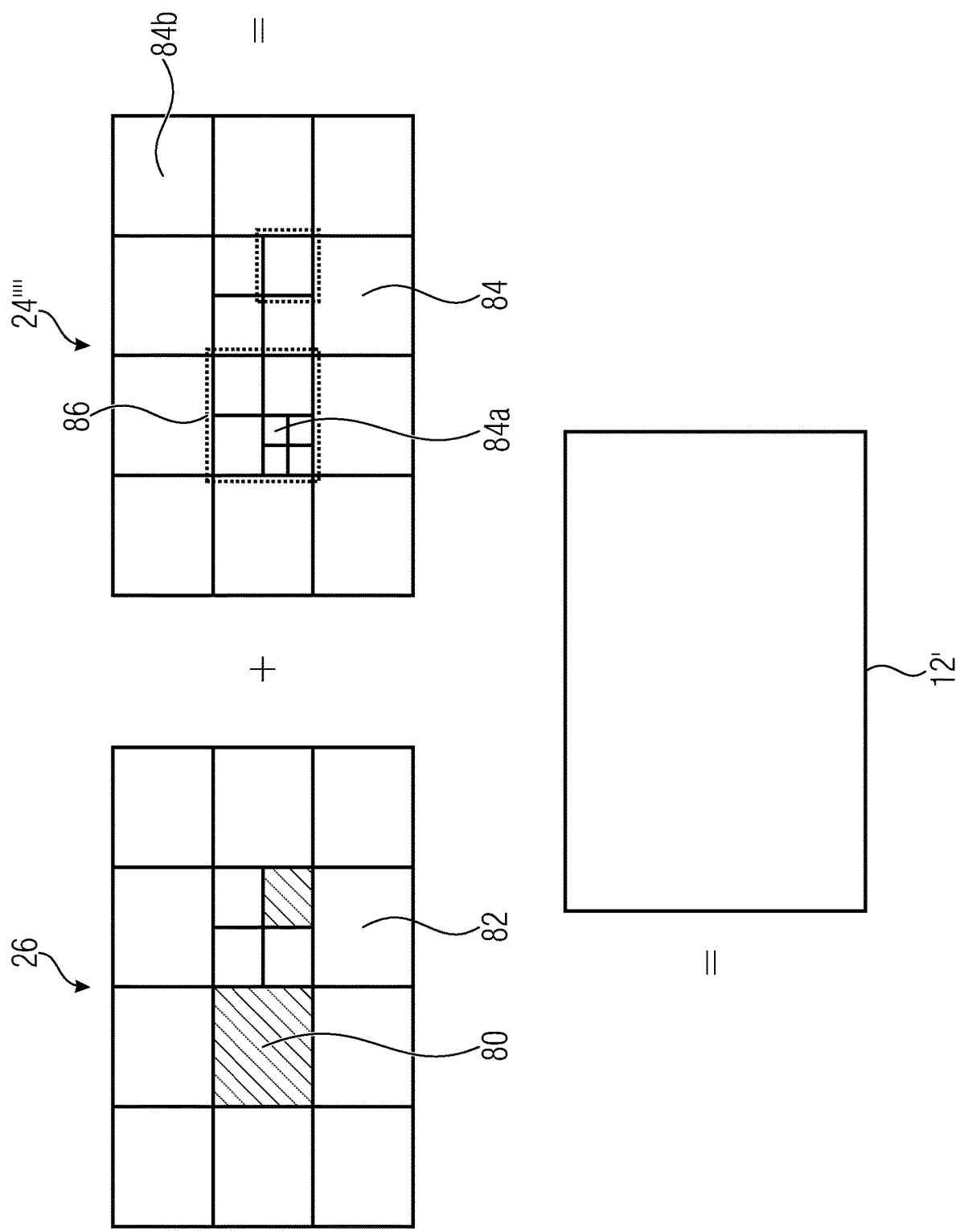
FIG. 3 shows a schematic diagram illustrating an example for a relationship between the prediction residual signal, the prediction signal and the reconstructed signal so as to illustrate possibilities of setting subdivisions for coding mode selection, transform selection and transform performance, respectively.

FIG. 3 illustrates the relationship between the reconstructed signal, i.e. the reconstructed picture 12', on the one hand, and the combination of the prediction residual signal 24'''' as signaled in the data stream, and the prediction signal 26, on the other hand. As already denoted above, the combination may be an addition. The prediction signal 26 is illustrated in FIG. 3 as a subdivision of the picture area into intra-coded blocks which are illustratively indicated using hatching, and inter-coded blocks which are illustratively indicated not-hatched. The subdivision may be any subdivision, such as a regular subdivision of the picture area into rows and columns of blocks, or a multi-tree subdivision of picture 12 into leaf blocks of varying size, such as a quadtree subdivision or the like, into blocks, wherein a mixture thereof is illustrated in FIG. 3 where the picture area is first subdivided into rows and columns of tree-root blocks which are then further subdivided in accordance with a recursive multi-tree subdivisioning. Again, data stream 14 may have an intra-coding mode coded thereinto for intra-coded blocks 80, which assigns one of several supported intra-coding modes to the respective intra-coded block 80. Further details are described below. For inter-coded blocks 82, the data stream 14 may have one or more motion parameters coded thereinto. Generally speaking, inter-coded blocks 82 are not restricted to being temporally coded. Alternatively, inter-coded blocks 82 may be any block predicted from previously coded portions beyond the current picture 12 itself, such as previously coded pictures of a video to which picture 12 belongs, or picture of another view or an hierarchically lower layer in the case of encoder 10 and decoder 20 being scalable encoders and decoders, respectively. The prediction residual signal 24'''' in FIG. 3 is also illustrated as a subdivision of the picture area into blocks 84. These blocks might be called transform blocks in order to distinguish same from the coding blocks 80 and 82. In effect, FIG. 3 illustrates that encoder 10 and decoder 20 may use two different subdivisions of picture 12 and picture 12', respectively, into blocks, namely one subdivisioning into coding blocks 80 and 82, respectively, and another subdivision into transform blocks 84. Both subdivisions might be the same, i.e. each coding block 80 and 82, may concurrently form a transform block 84, but FIG. 3 illustrates the case where, for instance, a subdivision into transform blocks 84 forms an extension of the subdivision into coding blocks 80, 82 so that any border between two blocks of blocks 80 and 82 overlays a border between two blocks 84, or alternatively speaking each block 80, 82 either coincides with one of the transform blocks 84 or coincides with a cluster of transform blocks 84. However, the subdivisions may also be determined or selected independent from each other so that transform blocks 84 could alternatively cross block borders between blocks 80, 82. As far as the subdivision into transform blocks 84 is concerned, similar statements are thus true as those brought forward with respect to the subdivision into blocks 80, 82, i.e. the blocks 84 may be the result of a regular subdivision of a picture area into blocks, arranged in rows and columns, the result of a recursive multi-tree subdivisioning of the picture area, or a combination thereof or any other sort of blockation. Just as an aside, it is noted that blocks 80, 82 and 84 are not restricted to being of quadratic, rectangular or any other shape.

FIG. 3 illustrates that the combination of the prediction signal 26 and the prediction residual signal 24'''' directly results in the reconstructed signal 12'. However, it should be noted that more than one prediction signal 26 may be combined with the prediction residual signal 24'''' to result into picture 12' in accordance with alternative embodiments.

In FIG. 3, the transform blocks 84 shall have the following significance. Transformer 28 and inverse transformer 54 perform their transformations in units of these transform blocks 84. For instance, many codecs use some sort of DST or DCT for all transform blocks 84. Some codecs allow for skipping the transformation so that, for some of the transform blocks 84, the prediction residual signal is coded in the spatial domain directly. However, in accordance with embodiments described below, encoder 10 and decoder 20 are configured in such a manner that they support several transforms. For example, the transforms supported by encoder 10 and decoder 20 could comprise:

DCT-II, where DCT stands for Discrete Cosine Transform
DST-IV, where DST stands for Discrete Sine Transform
DCT-IV
DST-VII
Identity Transformation Naturally, while transformer 28 would support all of the forward transform versions of these transforms, the decoder 20 or inverse transformer 54 would support the corresponding backward or inverse versions thereof:

Inverse DCT-II
Inverse DST-IV
Inverse DCT-IV
Inverse DST-VII
Identity Transformation The subsequent description provides more details on which transforms could be supported by encoder 10 and decoder 20. In any case, it should be noted that the set of supported transforms may comprise merely one transform such as one spectral-to-spatial or spatial-to-spectral transform.

As already outlined above, FIGS. 1 to 3 have been presented as an example where the concept described further below may be implemented in order to form specific examples for encoders 10 and decoders 20 according to the present application. Insofar, the encoder 10 and decoder 20 of FIGS. 1 and 2, respectively, represent possible implementations of the encoders and decoders described herein below. FIGS. 1 and 2 are, however, only examples. An encoder according to embodiments of the present application may, however, perform block-based encoding of a picture 12 using the concept outlined in more detail below and being different from the encoder of FIG. 1 such as, for instance, in that same is no video encoder, but a still picture encoder, in that same does not support inter-prediction, or in that the sub-division into blocks 80 is performed in a manner different than exemplified in FIG. 3, or even in that this encoder does not use transform prediction residual coding with coding the prediction residual, for instance, in spatial domain directly instead. Likewise, decoders according to embodiments of the present application may perform block-based decoding of picture 12' from data stream 14 using the concept further outlined below, but may differ, for instance, from the decoder 20 of FIG. 2 in that same is no video decoder, but a still picture decoder, in that same does not support intraprediction, or in that same sub-divides picture 12' into blocks in a manner different than described with respect to FIG. 3 and/or in that same does not derive the prediction residual from the data stream 14 in transform domain, but in spatial domain, for instance.

Figure 4A:
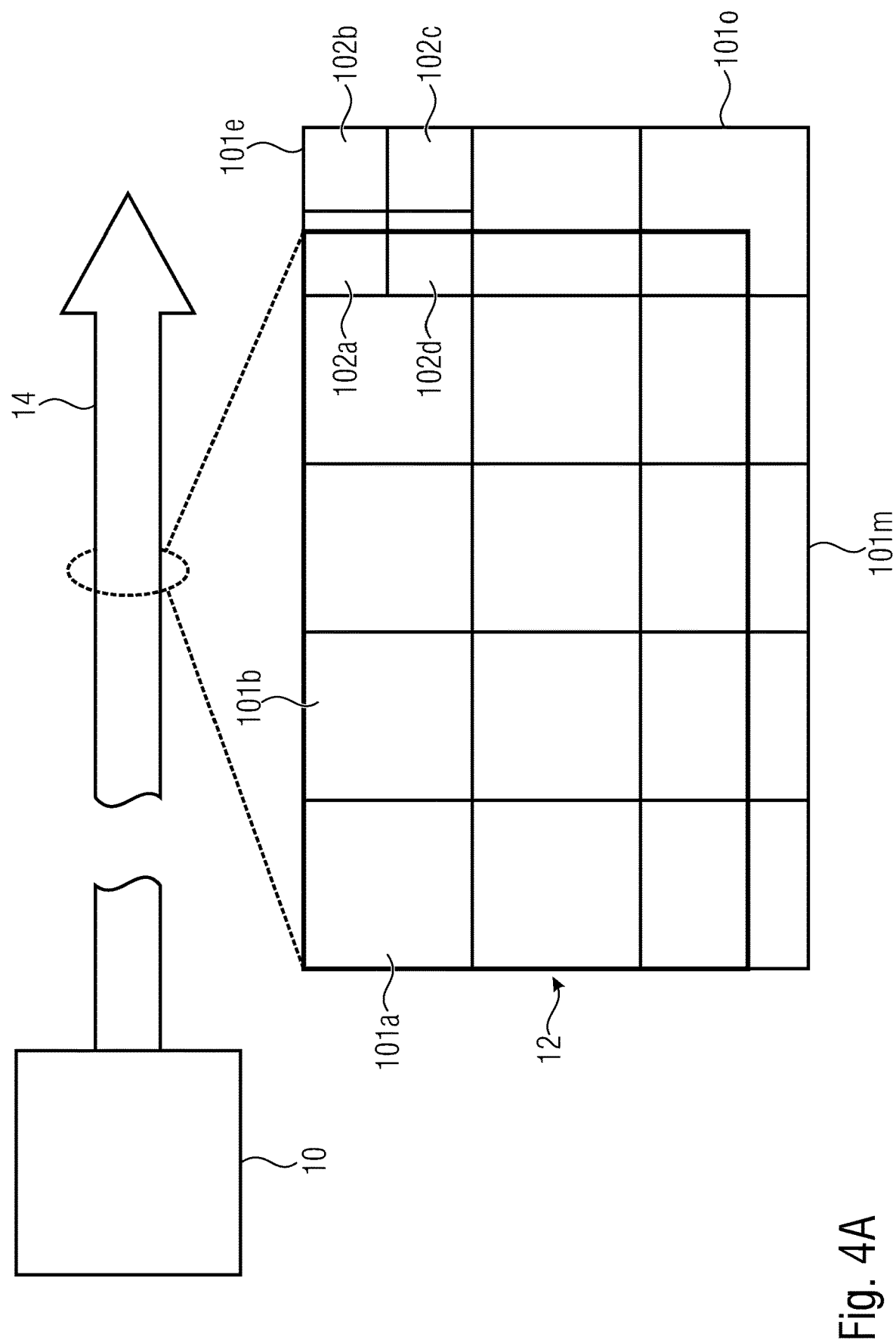
FIG. 4A shows an embodiment of an encoder according to the present concept.

FIG. 4A shows an embodiment of an apparatus 10 for encoding a picture 12 into a data stream 14. The picture 12 may be subdivided into blocks, or in case of e.g. HEVC-based codecs, subdivided into macroblocks, also referred to as CTUs, 101a, 101b, . . . , 101o.

The apparatus 10, in the following also referred to as encoder 10, is configured to further partition the macroblocks 101a, 101b, . . . , 101o into smaller subblocks 102a, 102b, 102c, 102d, and finally into leaf blocks. The encoder 10 is configured to partition the picture 12 into leaf blocks by using a recursive multi-tree partitioning. In order to further process said leaf blocks, the encoder 10 is configured to block-based encode the picture 12 into the data stream 14, i.e. by encoding the leaf blocks.

Said block-based encoding of the picture 12 into the data stream 14 may comprise a respective signaling in the data stream 14, which signaling may comprise, inter alia, an indication regarding the partitioning into the data stream 14, for example an indication for indicating one or more partitioning parameters, such as a split mode and a split ratio being used for a partitioning of a current block.

With respect to the multi-tree partitioning, the blocks may be partitioned along a splitting tree, wherein each node of the splitting tree may belong to a respective block in the picture. If a block is split, the split tree may succeed to a subsequent tree node at a subsequent split level, also referred to as a partitioning level. The above mentioned signaling in the data stream 14 may be done at one or more partitioning levels. According to some examples, partitioning parameters may be signaled in the data stream 14 at one or more partitioning levels, and in some other examples partitioning parameters may be signaled in the data stream 14 at each partitioning level. According to a further example, partitioning parameters may be signaled in the data stream 14 at a partitioning level in the split tree, wherein the tree nodes at said partitioning level may belong to one or more blocks which are located at a picture boundary of the picture 12 to be encoded. The above described signaling in the data stream 14 may be used in connection with each of the inventive concepts and corresponding embodiments as described herein.

Returning to FIG. 4A, it can be seen that the macroblocks 101a, 101b, . . . , 101o are quadratic structures of a predetermined size spanning a fixed grid over the picture 12. Since this fixed grid may exceed the size of the picture 12, it may sometimes happen that some of the macroblocks 101a, 101b, . . . , 101o of said grid may exceed the boundaries of the picture 12. In FIG. 4A, such a scenario is exemplarily shown by means of macroblocks 101e, 101m and 101o.

For example with respect to macroblock 101e, an upper left portion and a lower left portion of macroblock 101e may be located inside the picture 12, while an upper right portion and a lower right portion of macroblock 101e may be located outside the picture 12. Accordingly, the macroblock 101e extends beyond a boundary of the picture 12 such that said boundary of the picture 12 crosses the macroblock 101e at a certain position, namely at such a position according to which an upper left portion and a lower left portion of the macroblock 101e are located inside the picture 12, while an upper right portion and a lower right portion of the macroblock 101e are located outside the picture 12.

For example with respect to macroblock 101o, only an upper left portion of the macroblock 101o is located inside the picture 12, while top right, bottom right and bottom left portions of macroblock 101o are located outside the picture 12. Furthermore, regarding macroblock 101m, a top left portion and a top right portion of macroblock 101m are located inside the picture 12, while a bottom left and a bottom right portion of macroblock 101m are located outside the picture 12. Accordingly, the respective boundary of the picture 12 crosses the respective macroblocks 101e, 101m, 101o at different positions. More details about the positions of the macroblocks, and in particular with respect to positions of the macroblocks 101e, 101m, 101o relative to the boundaries of the picture 12 will be explained somewhat later in the text with reference to FIG. 6.

As mentioned above, the macroblocks 101a, 101b, . . . , 101o may be partitioned into smaller subblocks and finally into leaf blocks. A non-limiting example is shown with respect to subblocks 102a, 102b, 102c, 102d. Subblocks may themselves be subjected to partitioning until a leaf block is reached. The partitioning may also be referred to as splitting, wherein such splitting of macroblocks and subblocks may be executed by using different split modes. Examples may be quad splits, horizontal binary splits, vertical bi-splits, horizontal ternary splits and vertical ternary splits. Split signaling might be performed using a binary decision tree, wherein said split signaling may be indicated in the data stream 14 in a way as previously described above.

Figure 5A:
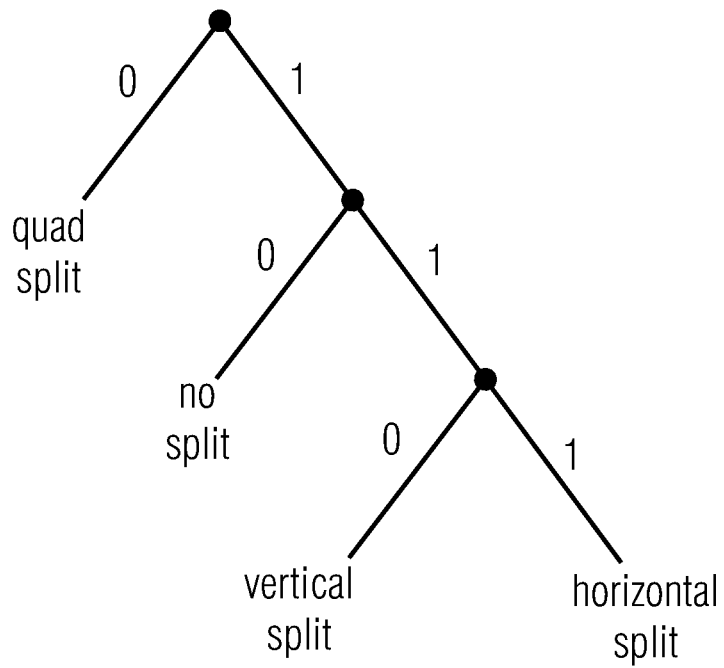
FIG. 5A shows a fully unrestricted decision tree comprising a full set of available split modes.
Figure 5B:
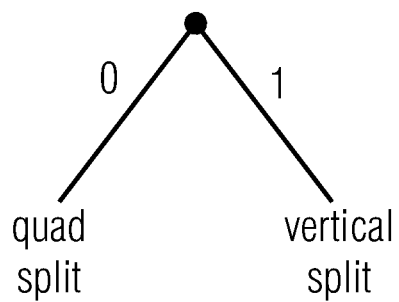
FIG. 5B shows a restricted decision tree comprising a reduced set of split modes according to the present concept.
Figure 5C:
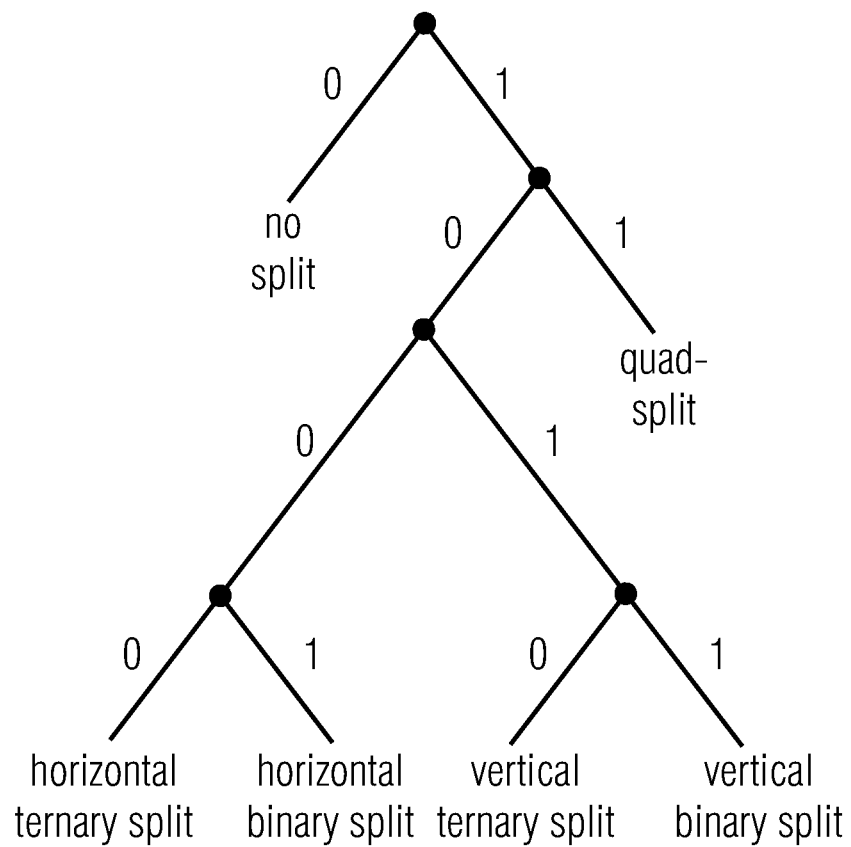
FIG. 5C shows a further fully unrestricted decision tree comprising a full set of available split modes.
Figure 5D:
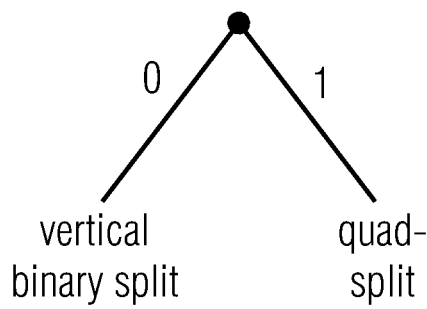
FIG. 5D shows a restricted decision tree comprising a reduced set of split modes according to the present concept.

For a brief explanation of such a decision tree, it shall be referred to FIGS. 5A to 5D, which Figures compare a split signaling at a boundary of a picture with a split signaling inside a picture. FIGS. 5A and 5C depict a fully unrestricted decision tree that may be used for split signaling inside a picture, while FIGS. 5B and 5D depict an exemplary restricted decision tree according to the present concept that may be used for split signaling at a picture boundary.

The fully unrestricted decision tree in FIG. 5A may be used in the present concept as an available set of split modes that may, for instance, be based on a Quad Tree plus Binary Tree structure as described in [2]. The QTBT scheme comprises an available set of split modes for splitting a block into a smaller block which available set contains the four depicted split modes, namely a quad split, no split, a vertical split or a horizontal split. Accordingly, upon each partitioning of a block into a smaller block, the known encoder may always have to step through the fully unrestricted decision tree, i.e. through the full set of available split modes. As can be seen, for reaching the horizontal or vertical split in the decision tree, three bins are spent. The encoder further has to signal the respectively selected split mode in the data stream. At a picture boundary, however, the known technology may perform an implicit quad split and refrain from signaling any related indication in the data stream. This results in a quite inflexible handling of blocks at a picture boundary.

The fully unrestricted decision tree in FIG. 5C may be used in the present concept as an available set of split modes that may, for instance, be based on a Quad Tree plus Binary Tree plus a Multi-Type-Tree structure as described in [2] and [3]. The QTBT+MTT scheme comprises an available set of split modes for splitting a block into a smaller block which available set contains the six depicted split modes, namely a quad split, no split, a vertical binary split, a vertical ternary split, a horizontal binary split and a horizontal ternary split. Accordingly, upon each partitioning of a block into a smaller block, the known encoder may always have to step through the fully unrestricted decision tree, i.e. through the full set of available split modes. In this example, for reaching the horizontal or vertical split in the decision tree, four bins are spent. The encoder further has to signal the respectively selected split mode in the data stream. At a picture boundary, however, the known technology may perform an implicit quad split and refrain from signaling any related indication in the data stream. This results in an even more inflexible handling of blocks at a picture boundary compared to FIG. 5A.

Thus, according to the invention, the encoder 10 is configured to reduce an available set of split modes to provide a reduced set of split modes, at least for those predetermined blocks, that are located at a picture boundary, i.e. at least partially inside the picture 12, as exemplarily described before with reference to the predetermined blocks 101e, 101m and 101o shown in FIG. 4A.

As exemplarily shown in FIGS. 5B and 5D, the aforementioned reduced set of split modes may, for instance, comprise exactly two split modes. Alternatively, a reduced set of split modes may comprise more than two split modes, or exactly one split mode.

For example, a reduced set of split modes may comprise a quad split and a vertical split. The vertical split may, for instance be a vertical binary split or a vertical ternary split.

Additionally or alternatively, the reduced set of split modes may, for instance, comprise a quad split and a horizontal split. The horizontal split may, for instance be a horizontal binary split or a horizontal ternary split.

Additionally or alternatively, the reduced set of split modes may, for instance, comprise a vertical split and a horizontal split. The horizontal split may, for instance be a horizontal binary split or a horizontal ternary split, and the vertical split may, for instance, be a vertical binary split or a vertical ternary split.

Additionally or alternatively, the reduced set of split modes may, for instance, comprise a quad-split only.

Additionally or alternatively, the reduced set of split modes may, for instance, comprise either a horizontal split or a vertical split, for example in case a quad-split may not be available.

Additionally or alternatively, the reduced split modes may, for instance, comprise exactly one predetermined split mode which can either be a horizontal or a vertical split. Which split to choose may depend on the position of the predetermined block relative to the respective picture boundary, e.g. the horizontal split may be selected in case of the bottom picture boundary, while the vertical split may be selected in case of the right picture boundary. The horizontal split may be a horizontal bi-split or a horizontal ternary split. The vertical split may be a vertical bi-split or a horizontal ternary split. As can be seen in the decision tree, e.g. in FIG. 5D, only one of the horizontal or vertical split may be available in the reduced set.

In each of the above cases, one or more of the binary splits may, for example, comprise a split-ratio of %.

Summarizing in more general terms, a reduced split set according to the herein described innovative principle may comprise the following splits:
  (a) If such a split exists, an unrestricted split which will, when applied, not obstruct further sub-partitioning of a given block.
  (b) If such a split exists, a split which will create an edge parallel to the picture boundary, and i. if such a split exists and is allowed for a given block, a split placed in the middle of the split block, or ii. if such a split exists and is allowed for a given block, a split which will create a partitioning edge collocated with the picture boundary.

In a particular non-limiting embodiment of this invention based on QTBT, but also valid for [3] and [4] as well as other partitioning schemes providing the above mentioned different split possibilities: quad-split, vertical ternary split, vertical binary split, horizontal ternary split, and horizontal binary split; reduced split sets according to the innovative principle described herein may be:

Quad-split and vertical bi-split, e.g. with split ratio 1/2-i or vertical ternary split-ii Quad-split and horizontal bi-split, e.g. with split ratio 1/2-i, or horizontal ternary split-ii Quad-split or either horizontal or vertical binary or ternary split, e.g. with split ratio 1/2

Accordingly, a reduced set of split modes according to the innovative principle may comprise pre-selected ones of split modes for splitting a block at a picture boundary. The encoder 10 may select one of the split modes contained in the reduced set of split modes for partitioning the block at the picture boundary, and the encoder 10 may signal the selected split mode in the data stream 14. Thus, the present concept may extend the signaling for blocks at picture boundaries when compared to implicit quad splits in the known technology. However, the encoder 10 may only have to signal the uncertainty in the data stream 14 which keeps the signaling effort at a considerable level. However, the present concept provides for a much higher flexibility in partitioning blocks at a picture boundary compared to the known technology. This gain in flexibility may compensate and/or outweigh the slightly higher signaling effort.

Even though FIG. 5B may exemplarily depict a reduced set of split modes comprising two different split modes, namely a quad split and a vertical bi-split, the reduced set may also comprise a quad split and a horizontal bi-split, or a vertical bi-split and a horizontal bi-split, or any other combination as discussed above. According to an example, the reduced set of split modes may comprise at least one split mode. According to a further example, the reduced set of split modes may comprise at least two different split modes. According to yet a further example, the reduced set of split modes may comprise exactly two different split modes only, even though an available set of split modes may contain more than these two different split modes.

The selection of the split modes that shall be contained in the reduced set of split modes may depend on the position of the respective predetermined block 101e, 101m, 101o relative to the boundary of the picture 12, i.e. depending on a position at which the boundary of the picture 12 crosses the predetermined block 101e, 101m, 101o.

In other words, the encoder 10 is configured to, in partitioning the picture 12 into the leaf blocks, for a predetermined block 101e, 101m, 101o that corresponds to a predetermined tree level of the multi-tree partitioning and which extends beyond a boundary of the picture 12, reduce an available set of split modes for splitting the predetermined block 101e, 101m, 101o depending on a position at which the boundary of the picture 12 crosses the predetermined block 101e, 101m, 101o to obtain a reduced set of one or more split modes.

According to the invention, if a cardinality of the reduced set is one, i.e. if the reduced set of split modes may comprise only one split mode, the encoder 10 is configured to apply this split mode of the reduced set for splitting the predetermined block 101e, 101m, 101o.

However, if a cardinality of the reduced set is greater than one, i.e. if the reduced set of split modes comprises two or more split modes, the encoder 10 is configured to select one of these split modes of the reduced set and to apply the selected one of the split modes for splitting the predetermined block 101e, 101m, 101o. Furthermore, the encoder 10 is configured to signal the respective selection, i.e. the selected split mode, in the data stream 14 in a way as explained above. For example, the encoder 10 may signal the selection by setting a 1-bit flag. However, as described above, only the uncertainty between the split modes that are contained in the already reduced set of split modes may have to be signaled in the data stream 14.

As mentioned above, the cardinality of the reduced set may, for example, be exactly one or exactly two.

Figure 4B:
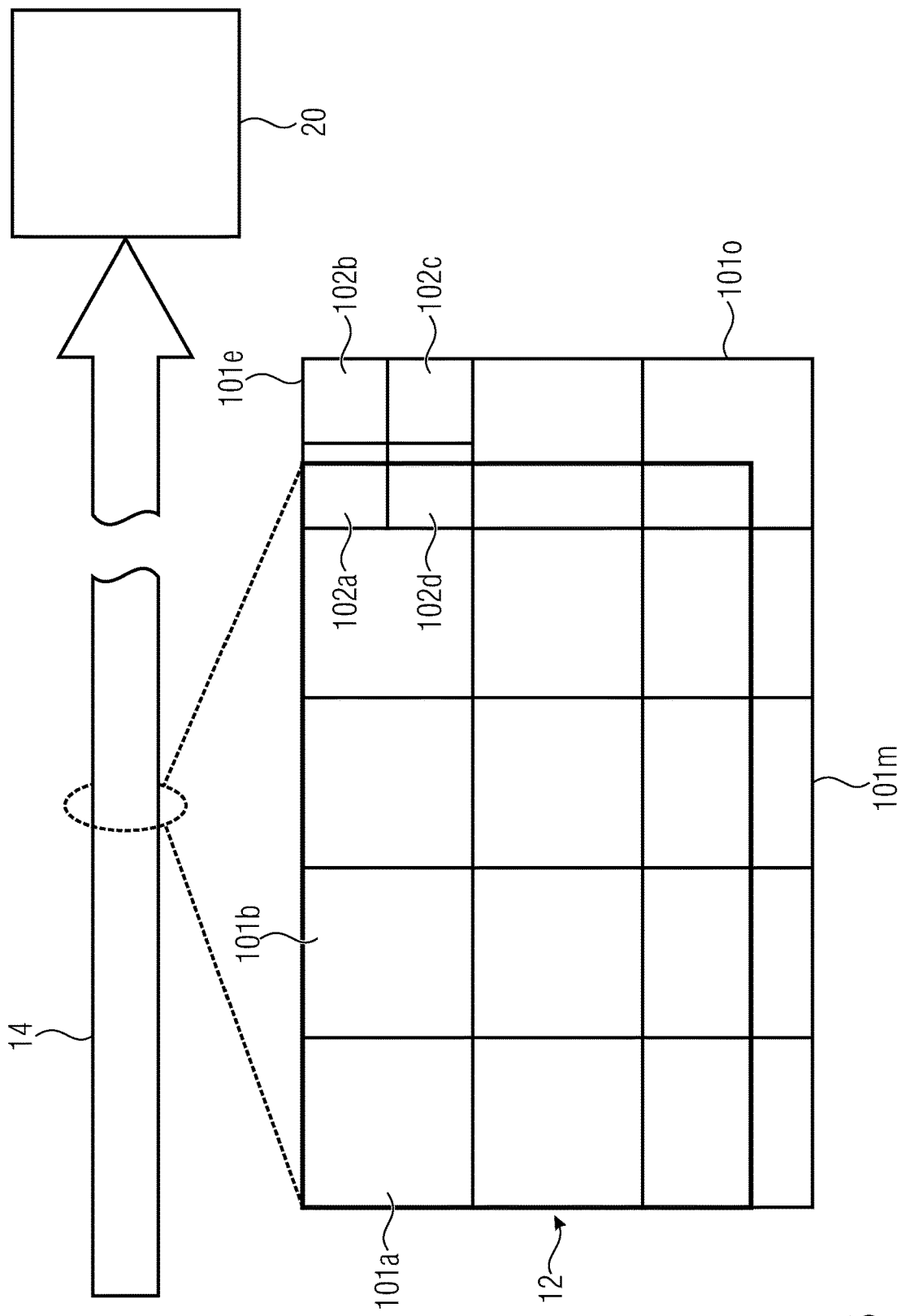
FIG. 4B shows an embodiment of a decoder according to the present concept.

FIG. 4B shows the corresponding apparatus 20 for decoding the picture 12 in the data stream 14, said apparatus being also referred to in the following as a decoder 20.

The decoder 20 is configured to partition the picture 12 into leaf blocks using recursive multi-tree partitioning, and to block-based decode the picture 12 from the data stream 14 using the partitioning of the picture 12 into leaf blocks.

The decoder 20 is further configured to, in partitioning the picture 12 into the leaf blocks, for a predetermined block that corresponds to a predetermined tree level of the multi-tree partitioning and which extends beyond a boundary of the picture 12, reduce an available set of split modes for splitting the predetermined block depending on a position at which the boundary of the picture 12 crosses the predetermined block to obtain a reduced set of one or more split modes.

Again, if a cardinality of the reduced set is one, i.e. if the reduced set of split modes may comprise only one split mode, the decoder 20 is configured to apply the split mode of the reduced set for splitting the predetermined block.

If a cardinality of the reduced set is greater than one, i.e. if the reduced set of split modes comprises two or more split modes, the decoder 20 is configured to select one of the split modes of the reduced set and to apply the selected one of the split modes for splitting the predetermined block according to a signalization in the data stream 14. That is, the decoder 20 may derive a signal from the data stream 14 indicating towards the decoder 20 which split mode to use for the partitioning. This signal may be the above mentioned 1-bit flag that may have been previously packed into the data stream by the encoder 10.

Accordingly, the concept as described herein provides a novel mechanism of boundary handling. It may be applicable to all recursive partitioning methods that generally allow more than one split at a specific level. Again, the present concept may extend the signaling for blocks at picture boundaries when compared to implicit splits of the known technology. However, the present concept provides for a much higher flexibility in partitioning blocks at a picture boundary compared to the known technology. This gain in flexibility may compensate and/or outweigh the slightly higher signaling effort of the reduced set of split modes according to the present concept.

Figure 6:
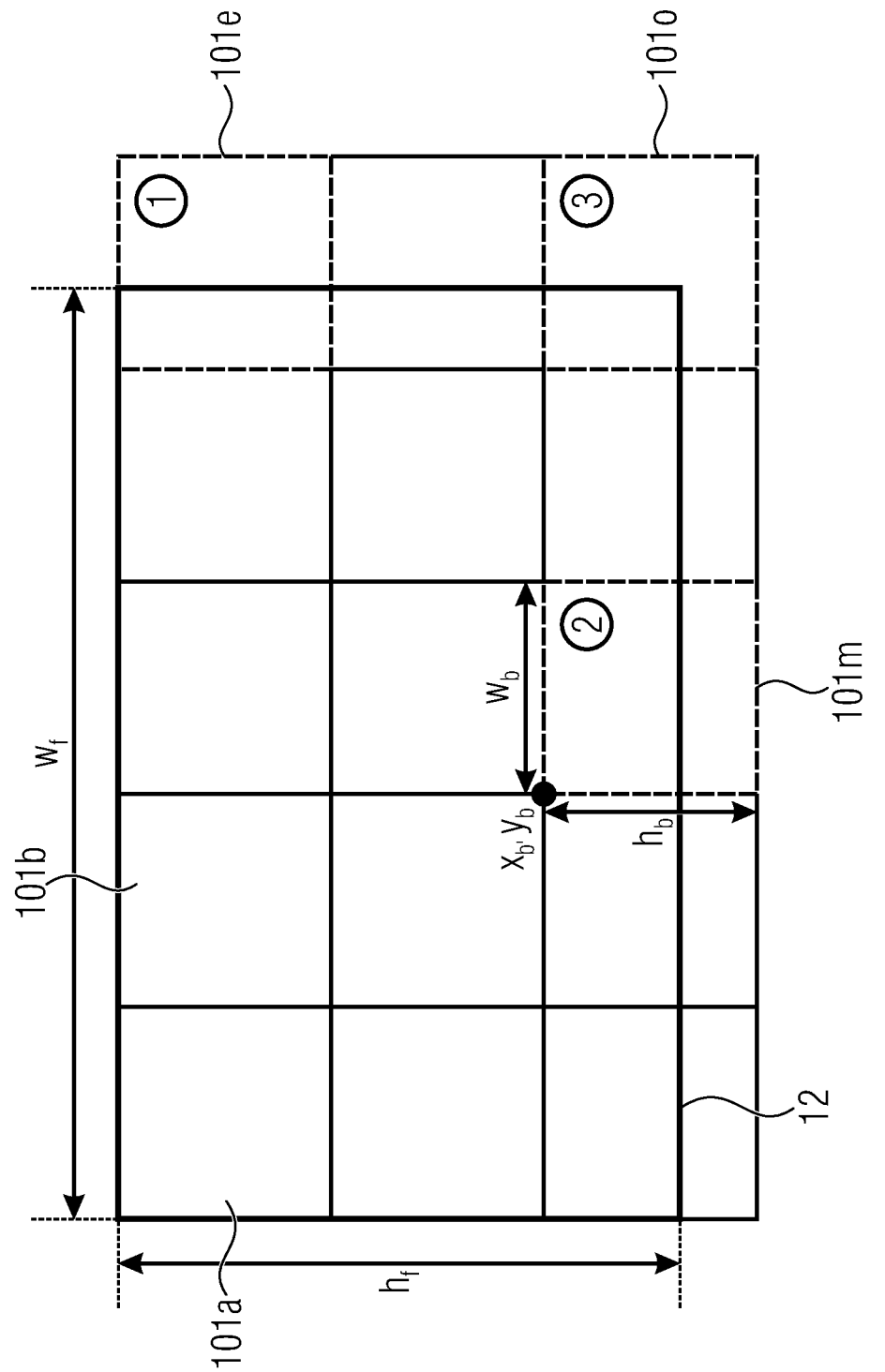
FIG. 6 shows a schematic illustration of different cases how blocks may extend beyond picture boundaries.

A non-limiting example of the present concept is depicted in FIG. 6 which shows a partitioned picture 12 similar to FIG. 4A. However, FIG. 6 shows some more details, namely a picture 12 having a size $w_p \times h_p$, which picture 12 is subdivided into blocks, for example macroblocks 101a, 101b, . . . , 101o, smaller subblocks and finally leaf blocks. Three particular macroblocks are highlighted and numbered with encircled numbers 1, 2 and 3. These exemplary highlighted macroblocks may correspond to previously described macroblocks 101e, 101m, 101o as shown in FIG. 4. Furthermore, leaf blocks will be discussed in more detail somewhat later in the text with reference to FIGS. 8A and 8B.

FIG. 6 shows a partitioning of the picture 12 into rigid macroblock structure of a fixed size. In this example it may be assumed that the video signal resolution may not be spatially restricted to multiples of the size of a single macroblock 101a, 101b, . . . , 101o. If those prerequisites are given, it may be inferred that the last macroblock of a macroblock line and/or all of the macroblocks in the last macroblock line might exceed at least one boundary of the picture 12. In such a case, the low-level partitioning of this macroblock into coding units, prediction units, and transform units or any other type of sub-CTU-level partitions should ensure that the coded partitions are located inside the boundaries of the picture 12. The concept as described herein may allow for a definition of reduced split sets for partitioning blocks, for example macroblock 101m being defined by position $x_b$, $y_b$, having a width $w_b$, and a height $h_b$, which blocks may exceed the boundaries of the picture 12 of size $w_f \times h_f$ in at least one of the following six cases:

C1: Corresponding to block 101e, i.e. the top right corner of the block 101e is not contained in the picture 12, the bottom left corner is contained in the picture 12: $x_b+w_b>w_f$; $y_b+h_b \leq h_f$; $x_b \geq 0$; $y_b \geq 0$ C2: Corresponding to block 101m, i.e. the top right corner of the block 101m is contained in the picture 12, the bottom left corner is not contained in the picture 12: $x_b+w_b \leq w_f$; $y_b+h_b>h_f$; $x_b \geq 0$; $y_b \geq 0$ C3: Corresponding to block 101o, i.e. both the top right and the bottom left corners are not contained in the picture 12: $x_b+w_b>w_f$; $y_b+h_b>h_f$; $x_b \geq 0$; $y_b \geq 0$ C4: The top left corner of a block is not contained in the picture, the bottom left corner is not contained in the picture 12, the top right corner is contained in the picture 12: $x_b<0$; $y_b \geq 0$; $x_b+w_b>0$ C5: The top left corner of a block is not contained in the picture 12, the top right corner is not contained in the picture 12, the bottom left corner is contained in the picture 12: $x_b \geq 0$; $y_b<0$; $y_b+h_b>0$ C6: Only one of the following block corners is contained in the picture 12: bottom right, top right or bottom left If none of the cases C1 to C6 is true for a specific predetermined block and picture 12, the predetermined block may lie outside of the boundaries of the picture 12 and may be of no further interest to the concept as described herein. More than one case can be true at once, specifically, case pairs C1 and C4, C2 and C5 or C3 and C6 can be true simultaneously. As those case pairs will all be handled equivalently, the specific constellations do not need to be handled separately.

For handling at least one of these cases C1 to C6, the present concept provides a reduced set of split modes that may comprise one or more split modes selected out of an actually available set of split modes.

This actually available set of split modes may be chosen by the encoder 10 depending on the used block-based coding scheme. According to an example, the encoder 10 may be configured to determine the available set of split modes for the predetermined block
independent from a location of the predetermined block relative to the picture boundary, and/or
dependent on a sequence of split modes of preceding tree levels from which the predetermined block emerges.

The same holds true for the decoder 20. According to an example, the decoder 20 may be configured to determine the available set of split modes for the predetermined block
independent from a location of the predetermined block relative to the picture boundary, and/or
dependent on a sequence of split modes of preceding tree levels from which the predetermined block emerges.

Again, for handling at least one of the above mentioned cases C1 to C6, the present concept provides a reduced set of split modes that may comprise one or more split modes selected out of the actually available set of split modes.

For example, a reduced split set may consist of the following splits:
(a) Provided that such a split exists: an unrestricted split that will, when applied, not impose restrictions on further splitting of a given block.
(b) For cases C1 and C2, provided that such a split exists: a split that will create an edge parallel to the boundary of the picture 12.
  i. Provided that such a split exists and that it is allowed for a given block: a split placed in the middle of the split block.
  ii. Provided that such a split exists and that it is allowed for a given block: a split which will create a partitioning edge collocated with the boundary of the picture 12.

In other words, the encoder 10 may be configured to, for reducing the available set of split modes to the reduced set of one or more split modes, select from the available set of split modes at least one of:
a first split mode comprising a split above) which does not impose any restriction onto one or more subsequent splits for subsequent tree levels succeeding the predetermined tree level, and
a second split mode comprising a split that splits the predetermined block into two or three subblocks along at least one split line that is parallel to the boundary's position in the predetermined block and which split line is at least one of centered inside the predetermined block-i above) or collocated to the boundary of the picture 12-ii above).

The same holds true for the decoder 20, respectively. That is, the decoder 20 may be configured to, for reducing the available set of split modes to the reduced set of one or more split modes, select from the available set of split modes at least one of:
a first split mode comprising a split above) which does not impose any restriction onto one or more subsequent splits for subsequent tree levels succeeding the predetermined tree level, and
a second split mode comprising a split that splits the predetermined block into two or three subblocks along at least one split line that is parallel to the boundary's position in the predetermined block and which split line is at least one of centered inside the predetermined block-i above) or collocated to the boundary of the picture 12-ii above).

If a split-ii is not available in the used partitioning method for a specified block, split-i may be included in the reduced split set. Split-i might be generally of advantage over split-ii. As mentioned above, at least one split may be included in the reduced split set.

According to an example, split may be a quad split and split-i may be at least one of a horizontal bi-split or a vertical bi-split. According to a further example, one of the additionally introduced splits as described in [3] and [4] could be used for-ii if the boundary of the picture 12 lies in 1/4 or 3/4 of the partitioned block. In a particular implementation a vertical or horizontal split having a split ratio of 1/2 could be of advantage over additional splits introduced in [3] and/or [4].

Figures 7A, 7B:
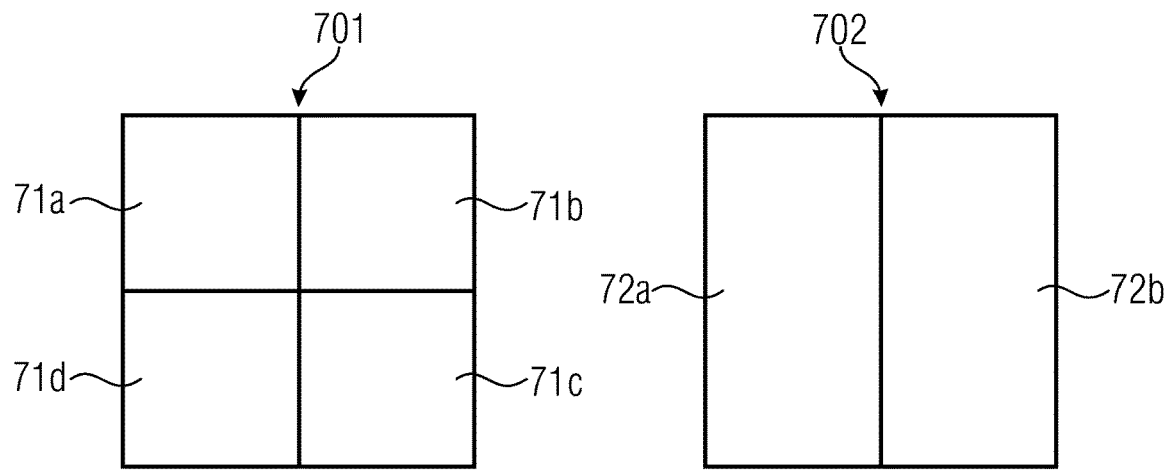
FIG. 7A shows an example of a quad split mode.
FIG. 7B shows an example of a vertical bi-split mode.
Figure 7C:
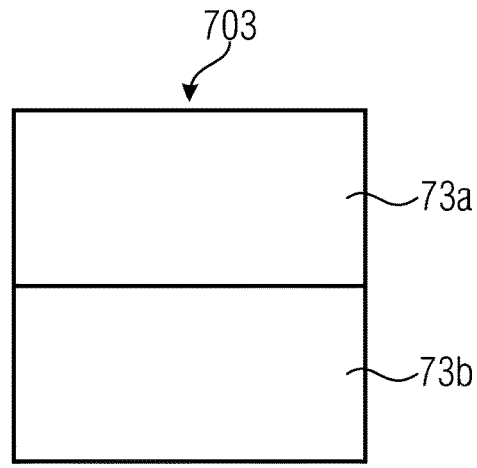
FIG. 7C shows an example of a horizontal bi-split mode.
Figures 7D, 7E:
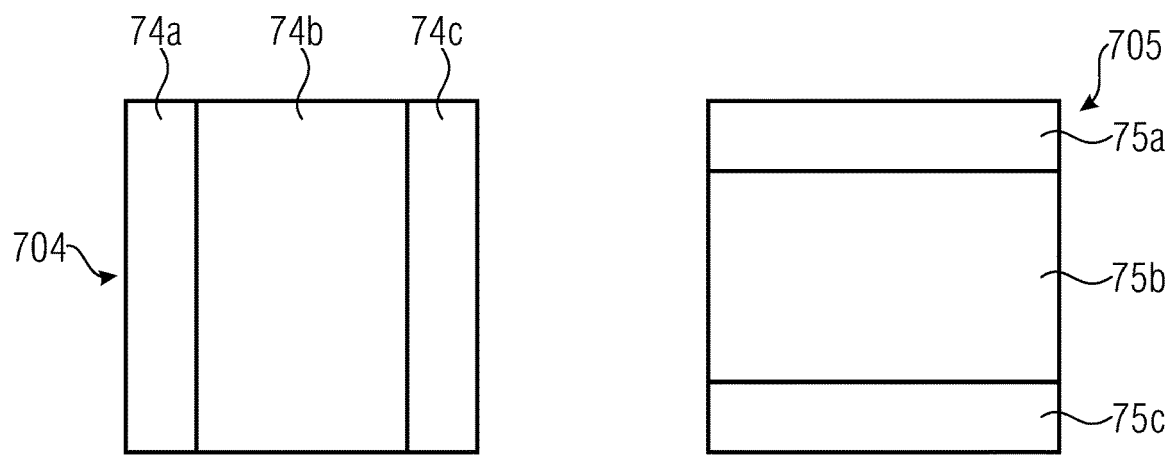
FIG. 7D shows an example of a vertical ternary split mode.
FIG. 7E shows an example of a horizontal ternary split mode.

The above mentioned splits are schematically shown in FIGS. 7A to 7E. FIG. 7A shows a quad split wherein a predetermined block 701 is splitted into four equal partitions 71a, 71b, 71c, 71d. FIG. 7B shows a vertical bi-split with splitting ratio 1/2 wherein a predetermined block 702 is splitted into two equal vertical partitions 72a, 72b. FIG. 7C shows a horizontal bi-split with splitting ratio 1/2 wherein a predetermined block 703 is splitted into two equal horizontal partitions 73a, 73b. FIG. 7D shows a vertical ternary split as described in [3] wherein a predetermined block 704 is splitted into three vertical partitions 74a, 74b, 74c. FIG. 7E shows a horizontal ternary split as described in [3] wherein a predetermined block 705 is splitted into three horizontal partitions 75a, 75b, 75c.

According to an example, the vertical bi-split as shown in FIG. 7B may be applied if the respective boundary of the picture 12 crosses the respective predetermined block 702 such that the boundary of the picture 12 that is located inside the respective block 702 is also vertical, i.e. parallel to the vertical split line. Such a case may, for instance, be true for block 101e as shown in FIG. 6.

The horizontal bi-split as shown in FIG. 7C may be applied if the respective boundary of the picture 12 crosses the respective predetermined block 703 such that the boundary of the picture 12 that is located inside the respective block 703 is also horizontal, i.e. parallel to the horizontal split line. Such a case may, for instance, be true for block 101m as shown in FIG. 6.

According to yet a further example which may make use of a Generalized Binary Splitting, split may be a perpendicular split having a split ratio of 1/2 or a quad split, if the Generalized GBS tree was used as a subtree to a quad-tree structure. Vertical and horizontal splits, possibly translated into perpendicular/parallel semantics may be used as split-i or -ii. Again, splits with the modifier 1/2 could be of advantage even if other splits would provide a split collocated with the boundary of the picture 12.

In yet a further example, which may be based on QTBT, but which may also be valid for the schemes as described in [3] and [4] as well as for any other partitioning schemes providing the following three split possibilities: quad split, vertical split with a split ratio of % and a horizontal split with a split ratio of 1/2 three exemplary reduced split sets may be:

RSS1: Quad-split and vertical split with split ratio 1/2-i
RSS2: Quad-split and horizontal split with split ratio 1/2-i
RSS3: Quad-split or either vertical or horizontal split with split ratio 1/2-i.

These exemplary reduced sets of split modes, i.e. RSS1, RSS2 and RSS3, may be one non-limiting example for a subset of an available set of split modes. That is, a reduced set of split modes may comprise one or more available splits being available in an available set of split modes. The number of splits contained in an available set of split modes may vary depending on the coding scheme, while the number of splits contained in a reduced set of split modes may vary depending on the position of the respective predetermined block relative to the boundary of the picture 12.

As mentioned above, the encoder 10 may determine an available set of split modes. That is, the encoder 10 may selectively choose which split modes shall be contained in the available set of split modes.

For example, the above mentioned block-based coding schemes may comprise a primitive set of split modes including a quad split, at least one horizontal bi-split and at least one vertical bi-split.

However, some of the splits, and in particular some of the bi-splits, may be restrictive. For example, if a bi-split was applied to a predetermined block, then a quad split may not be allowed as a subsequent split. In other words, a quad split may only be allowed at a certain tree level if preceding splits of previous tree levels did not contain one of the restrictive splits, and in particular one of the restrictive bi-splits.

Accordingly, if one of the restrictive splits, and in particular one of the restrictive bi-splits, has been applied to a predetermined block at a predetermined tree level, then subsequent splits may only contain the above mentioned primitive set but without the quad split.

Thus, according to an embodiment, the encoder 10 may be configured to determine the available set of split modes
 to be equal to a primitive set of split modes including a quad split, at least one horizontal bi-split and at least one vertical bi-split, if all split modes of preceding tree levels from which the predetermined block emerges are outside a restrictive set of bi-splits, and
 to be equal to the primitive set of split modes less the quad split, if a split mode of a preceding tree level from which the predetermined block emerges is one of the restrictive set of bi-splits.

The same holds true for the decoder 20. Accordingly, the decoder 20 may be configured to determine the available set of split modes
 to be equal to a primitive set of split modes including a quad split, at least one horizontal bi-split and at least one vertical bi-split, if all split modes of preceding tree levels from which the predetermined block emerges are outside a restrictive set of bi-splits, and
 to be equal to the primitive set of split modes less the quad split, if a split mode of a preceding tree level from which the predetermined block emerges is one of the restrictive set of bi-splits.

Additionally or alternatively, the above mentioned primitive set of split modes may include at least one horizontal ternary split and at least one vertical ternary split.

As mentioned above, the encoder 10 may reduce available sets of split modes so as to provide a reduced set of split modes. Therefore, the encoder 10 may selectively choose, for each predetermined block, a reduced subset of split modes out of the above mentioned available set of split modes. Only these selectively chosen split modes may then be contained in the reduced set of split modes. Thus, the reduced set of split modes may comprise at least one of the above mentioned quad split according to split, and one of the splits according to split-i or split-ii.

Thus, according to an embodiment, the encoder 10 may be configured to, for reducing the available set of split modes to the reduced set of one or more split modes, select from the available set of split modes at least one of:
 the quad split, and
 a bi-split that splits the predetermined block 702, 703 into two subblocks 72a, 72b, 73a, 73b along a split line that is parallel to the picture boundary's position in the predetermined block 702, 703 and which split line is at least one of centered inside the predetermined block according to split-i and collocated to the boundary according to split-ii.

Again, the same holds true for the decoder 20. Accordingly, the decoder 20 may be configured to, for reducing the available set of split modes to the reduced set of one or more split modes, select from the available set of split modes at least one of:
- the quad split, and
- a bi-split that splits the predetermined block 702, 703 into two subblocks 72a, 72b, 73a, 73b along a split line that is parallel to the picture boundary's position in the predetermined block 702, 703 and which split line is at least one of centered inside the predetermined block according to split-i and collocated to the boundary according to split-ii.

Again, split-i may comprise a bi-split, while split-ii may comprise a bi-split and/or a ternary split.

Thus, according to an embodiment, the encoder 10 may be configured to, for reducing the available set of split modes to the reduced set of one or more split modes, select from the available set of split modes at least one of:
- the quad split, and
- a ternary split that splits the predetermined block 704, 705 into three subblocks 74a, 74b, 74c, 75a, 75b, 75c along a split line that is parallel to the picture boundary's position in the predetermined block 704, 705 and which split line is collocated to the boundary according to split-ii.

Again, the same holds true for the decoder 20. Accordingly, the decoder 20 may be configured to, for reducing the available set of split modes to the reduced set of one or more split modes, select from the available set of split modes at least one of:
- the quad split, and
- a ternary split that splits the predetermined block 704, 705 into three subblocks 74a, 74b, 74c, 75a, 75b, 75c along a split line that is parallel to the picture boundary's position in the predetermined block 704, 705 and which split line is collocated to the boundary according to split-ii.

Figure 8B:
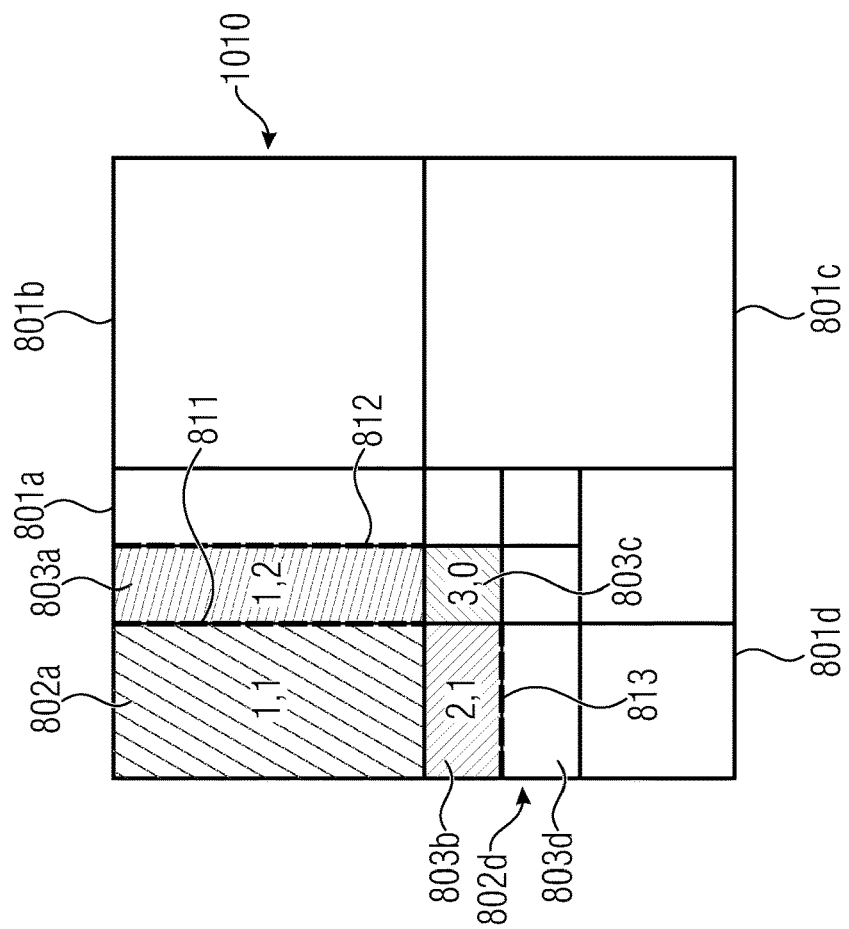
FIG. 8B shows an example of splitting a macroblock into leaf blocks using quad splits, vertical bi-splits and horizontal bi-splits selected from a reduced set of split modes.
Figure 8A:
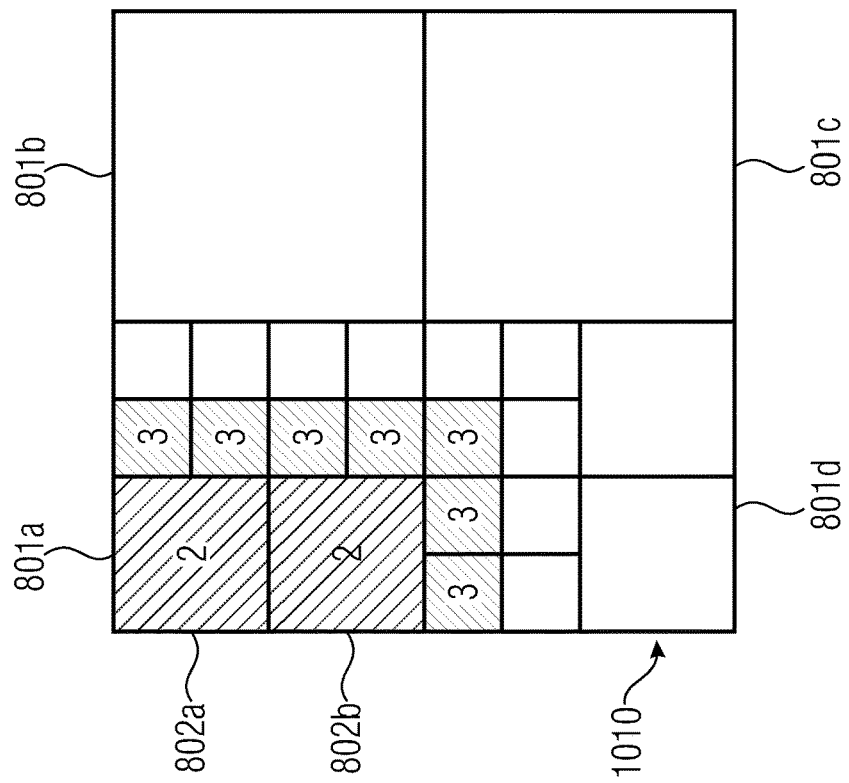
FIG. 8A shows an example of splitting a macroblock into leaf blocks using quad splits only.

FIGS. 8A and 8B show an example of how to apply the herein described concept to a block based coding scheme together with picture boundary handling.

FIG. 8A shows the partitioning of a predetermined block that may, in this example, correspond to macroblock 101o as shown in FIG. 6. The hatched parts of the block 101o represent the position of the lower right corner of the picture 12. This example shows a partitioning of the macroblock 101o into smaller subblocks by applying quad splits only.

The numbers indicated in the respective subblocks may indicate the number of quad splits that have to be applied so as to arrive at the leaf-block partitioning of the macroblock 101o as it is depicted in FIG. 8A. A first quad split divides the macroblock 101o into four equal subblocks 801a, 801b, 801c, 801d. As can be seen, only the left two subblocks 801a, 801d may still comprise the boundary of the picture 12. The right two subblocks 801b, 801c are located outside of the picture 12 and do not comprise the boundary of the picture 12 anymore. They can be discarded.

A second quad split divides the left two subblocks 801a, 801d into four smaller subblocks again. As can be seen, the left two subblocks 802a, 802b are located inside the picture 12 and do not contain the picture boundary anymore. Accordingly, these two subblocks 802a, 802b can be further partitioned using unrestricted split sets according to the used partitioning method. Further partitioning of those blocks may not be described in further detail herein with respect to the present concept.

However, the remaining subblocks have to be partitioned for a third time since all of them may still contain the picture boundary. Said third partitioning leads to leaf blocks which are indicated by numbers '3'.

FIG. 8B shows an alternative partitioning which applies the herein described concept of reduced split sets. The numbers in each subblock indicates the number of quad splits and non-quad splits that have to be applied so as to arrive at the leaf-block partitioning of macroblock 101o as shown in FIG. 8B. The first number may indicate the number of quad splits, and the second number may indicate the number of non-quad splits.

For example, for the upper left leaf block 802a one quad split and one vertical bi-split was applied. For the adjacent right leaf block 802b one quad split and two vertical bi-splits were applied. For the adjacent lower leaf block 802c two quad splits and one horizontal bi-split was applied. For the leaf block 802d in the lower right corner of the picture 12, three quad splits and none non-quad split were applied.

In FIG. 8B the solid lines indicate edges created by a quad split, the dashed lines indicate edges created by a vertical bi-split, and the dashed-dotted-line indicates an edge created by a horizontal bi-split.

In more detail, as a first split at a first tree level a quad split may be applied which results in four equal subblocks 801a, 801b, 801c, 801d. As can be seen, only the left two subblocks 801a, 801d may still comprise the boundary of the picture 12. The right two subblocks 801b, 801c are located outside of the picture 12 and do not comprise the boundary of the picture 12 anymore. They can be discarded.

The upper left subblock 801a may now be further partitioned at a second tree level. For the partitioning of subblock 801a a reduced split set may be provided. For example, a reduced split set comprising at least one of a quad split and a vertical bi-split, or comprising a vertical bi-split only, may be provided. In the example shown in FIG. 8B, the subblock 801a may be subjected to a vertical bi-split with a modifier 1/2 at the second tree level, wherein the split line 811 is centered inside the block 801a. Accordingly, the upper left subblock 802a may be created in result.

With the present concept, only one quad split and one vertical bi-split have to be applied to arrive at subblock 802a which is a leaf block. In FIG. 8A instead, two blocks 802a, 802b are used to cover the same area of the picture 12 as the only one block 802a of FIG. 8B.

Furthermore, the right adjacent block 802b in FIG. 8B may now be further partitioned at a third tree level. For the partitioning of subblock 802b a reduced split set may be provided again. For example, a reduced split set comprising at least a vertical bi-split may be provided, since the previous split was already a vertical bi-split such that a subsequent quad split may not be allowed. In the example shown in FIG. 8B, the subblock 802b may be subjected to a vertical bi-split with a modifier 1/2 at the third tree level, wherein the split line 812 is centered inside the block 802b and collocated with the picture boundary. Accordingly, the left subblock 803a may be created in result at the third tree level, wherein said left subblock 803a is a leaf block, but it might also by further partitioned with the used partitioning method.

With the present concept, only one quad split and two vertical bi-splits have to be applied to arrive at subblock 803a which is a leaf block. In FIG. 8A instead, four blocks are used to cover the same area of the picture 12 as the only one block 803a of FIG. 8B. However, if the encoder 10 decides so, partitioning 8A might just as well be applied if a quadsplit is always selected from the reduced split sets.

Furthermore, the lower adjacent block 802d in FIG. 8B may derive from two consecutive quad splits at a first and a second tree level, respectively, and block 802*d* may now further be partitioned at a third tree level. For the partitioning of subblock 802*d* a reduced split set may again be provided. For example, a reduced split set comprising at least a quad split and a horizontal bi-split, or a reduced split set comprising a horizontal bi-split only, may be provided. In the example shown in FIG. 8B, the subblock 802*d* may be subjected to a horizontal bi-split with a modifier 1/2 at the third tree level, wherein the split line 813 is centered inside the block 802*d* and collocated with the picture boundary. Accordingly, subblock 803*b* may be created in result at the third tree level, wherein said subblock 803*b* is a leaf block.

With the present concept, only two quad splits and one horizontal bi-split have to be applied to arrive at subblock 803*b* which is a leaf block. In FIG. 8A instead, two blocks are used to cover the same area of the picture 12 as the only one block 803*b* of FIG. 8B.

Block 803*c* may also be a leaf block that may be derived from three consecutive quad splits. This example of leaf block 803*c* may be identical to the quad split partitioning of the same block shown in FIG. 8A. The syntax may only allow to provide quad splits in a reduced set of split modes because the corner of the picture 12 is contained in the blocks leading to leaf block 803*c*.

According to an example, the encoder 10 may be configured to, for reducing the available set of split modes to the reduced set of one or more split modes, select from the available set of split modes the quad split only if the predetermined block extends beyond a corner of the picture 12.

The same holds true for the decoder 20. Accordingly, the decoder 20 may be configured to, for reducing the available set of split modes to the reduced set of one or more split modes, select from the available set of split modes the quad split only if the predetermined block extends beyond a corner of the picture 12.

As shown in FIG. 8B, the resulting leaf blocks 802*a*, 803*a*, 803*b*, 803*c* represent a minimal partitioning used to handle the boundaries of the picture 12. Additionally or alternatively, the resulting leaf blocks 802*a*, 803*a*, 803*b*, 803*c* might be further split within the given restriction of the used partitioning method.

Generally, the reduced split sets might be subjected to further limitations, provided that the final contains at least one valid split. Those limitations might be, but are not limited to:

Split availability for a specified block size
Split availability for a specified depth.

The latter bullet point "Split availability for a specified depth" shall be briefly explained by means of the following example, and again with reference to FIGS. 5A and 5B:

To ensure optimal efficiency, although some signaling is used instead of purely implicit split derivation, only limited information needs to be signaled. Most notably no information about splitting itself needs to be transferred. In the above discussed picture boundary cases C1 to C3 a split will be performed. If the reduced split set contains more than one element, only the remaining uncertainty needs to be signaled. In a particular embodiment based on QTBT described above, one binary signal would need to be transferred for cases C1 and C2, and no signaling would be required in case C3 because C1 may comprise a reduced split set comprising a quad split and a vertical bi-split, C2 may comprise a reduced split set comprising a quad split and a horizontal bi-split, and C3 may comprise a reduced split set comprising a quad split only.

Further syntax restrictions may apply in the present concept. For example, if a split causes additional restrictions to arise, those might be fully or partially discarded if the split block overlaps the picture boundary. According to an example, the number of subsequent binary splits may be restricted.

If a binary split is applied over a picture boundary as a part of a reduced set, it might not be counted in the enforcement of this restriction.

Thus, according to an example, if a bi-split from the reduced set is applied and the number of consecutive bi-splits is restricted to a predetermined maximum number of consecutive bi-splits, the encoder 10 may be configured to not count a consecutive bi-split if said consecutive bi-split is applied over a picture boundary.

The same holds true for the decoder 20. Accordingly, if a bi-split from the reduced set is applied and the number of consecutive bi-splits is restricted to a predetermined maximum number of consecutive bi-splits, the decoder 20 may be configured to not count a consecutive bi-split if said consecutive bi-split is applied over a picture boundary.

Other restrictions, e.g. forbidding a quad split to follow any split other than a quad-split, might be further enforced, even over picture boundaries.

Figure 9:
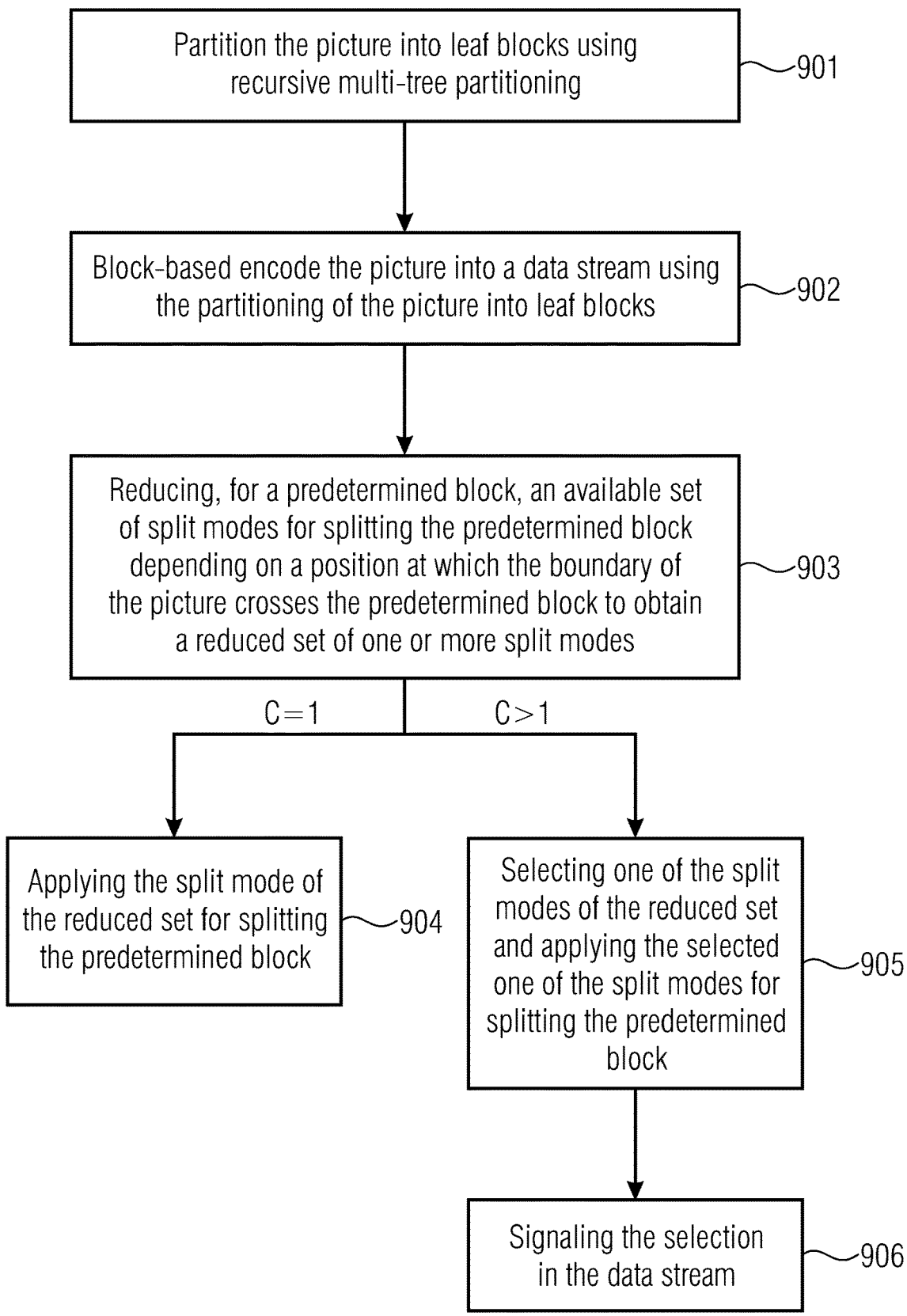
FIG. 9 shows a block diagram of a method for encoding a picture according to the present concept.

FIG. 9 shows a block diagram of a method of encoding a picture 12 according to the present concept.

In block 901 the picture is partitioned into leaf blocks using recursive multi-tree partitioning.

In block 902 the picture is block-based encoded into a data stream using the partitioning of the picture into leaf blocks.

In block 903, for a predetermined block, an available set of split modes for splitting the predetermined block is reduced, depending on a position at which the boundary of the picture crosses the predetermined block to obtain a reduced set of one or more split modes.

If a cardinality of the reduced set is one, the split mode of the reduced set is applied for splitting the predetermined block, as depicted by block 904.

If the cardinality of the reduced set is greater than one, one of the split modes of the reduced set is selected and the selected one of the split modes is applied for splitting the predetermined block, as depicted by block 905.

In block 906, the selection, i.e. the selected one of the split modes from the reduced set of split modes, is signaled in the data stream.

Figure 10:
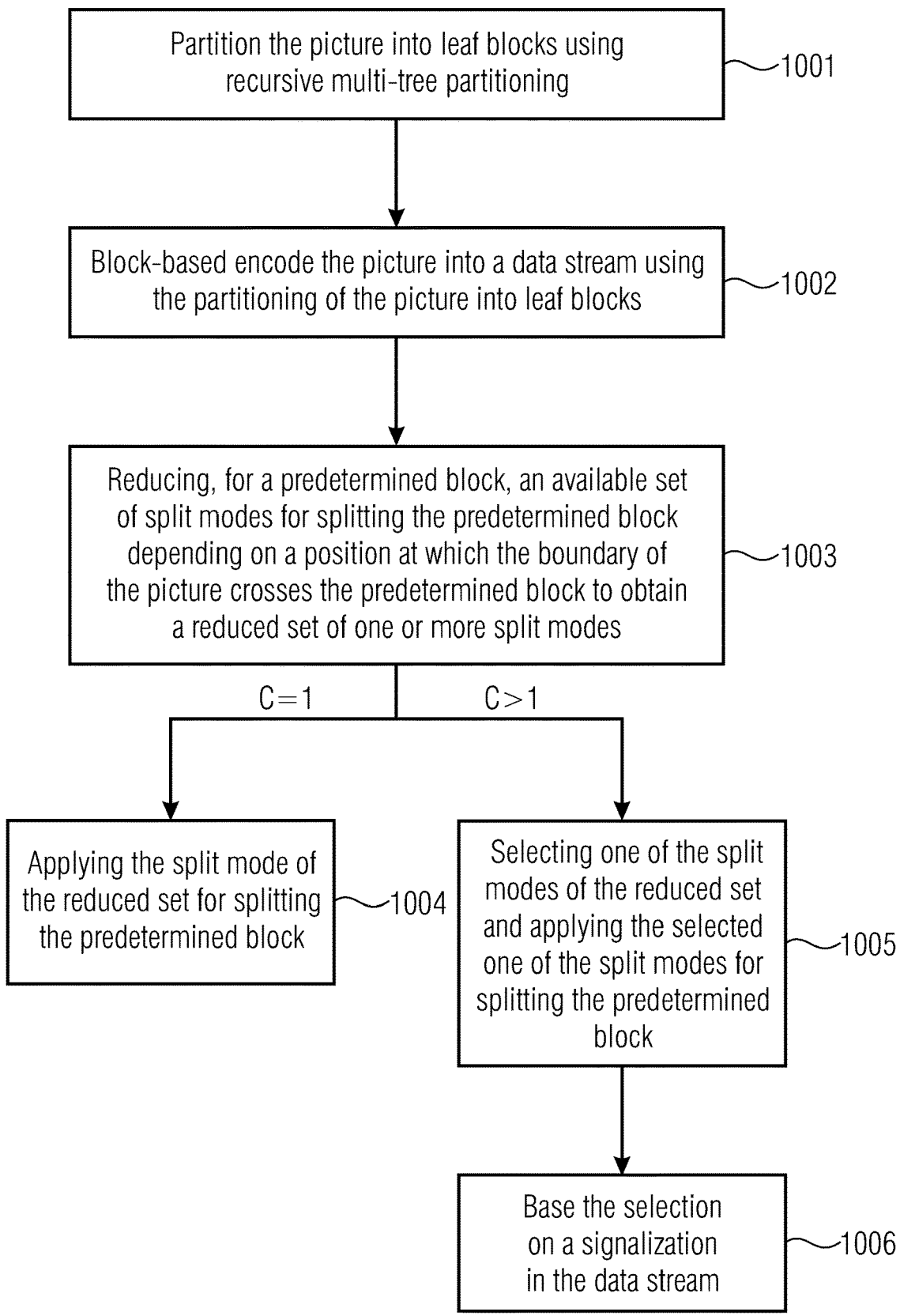
FIG. 10 shows a block diagram of a method for decoding a picture according to the present concept.

FIG. 10 shows a block diagram of a method of decoding a picture 12 according to the present concept.

In block 1001 the picture is partitioned into leaf blocks using recursive multi-tree partitioning.

In block 1002 the picture is block-based decoded from the data stream using the partitioning of the picture into leaf blocks.

In block 1003, for a predetermined block, an available set of split modes for splitting the predetermined block is reduced, depending on a position at which the boundary of the picture crosses the predetermined block to obtain a reduced set of one or more split modes.

If a cardinality of the reduced set is one, the split mode of the reduced set is applied for splitting the predetermined block, as depicted by block 1004.

If the cardinality of the reduced set is greater than one, one of the split modes of the reduced set is selected and the selected one of the split modes is applied for splitting the predetermined block, as depicted by block 1005.

As shown in block 1006, the selection of the one of the split modes from the reduced set of split modes is based on a signalization in the data stream.

The method steps, represented by the blocks in the block diagram of FIG. 9 and FIG. 10, respectively, may also be executed in a different order than depicted.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device may be used to perform some or all of the functionalities of the methods described herein. In some embodiments, a field programmable gate array may cooperate with a microprocessor in order to perform one of the methods described herein. Generally, the methods may be performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] ITU-T and ISO/IEC. High efficiency video coding. ITU-T Recommendation H.265 ISO/IEC 23008 10, edition 1, 2013; edition 2, 2014.
[2] J. Chen, E. Alshina, G. J. Sullivan, J.-R. Ohm, J. Boyce, Algorithm Description of Joint Exploration Test Model 6, JVET, doc. JVET-F1001, April 2017.
[3] X. Li, H.-C. Chuang, J. Chen, M. Karczewicz, L. Zhang, X. Zhao, A. Said, Multi-Type-Tree, JVET, doc. JVET-D0117, October 2016.
[4] F. Le Leannec, T. Poirier, F. Urban, Asymmetric Coding Units in QTBT, JVET, doc. JVET-D0064, October 2016.
[5] Not yet published European patent application No. 17182209.1

The invention claimed is:

1. A method for block-based encoding of a picture into a data stream according to a recursive multi-tree partitioning of the picture into leaf blocks, the method comprising:
   determining an available set of split modes for a predetermined block, based on a split availability for a specified partitioning depth and at least one of:
      a sum of an x-coordinate position of the predetermined block and a width of the predetermined block exceeding the picture's width; or
      a sum of a y-coordinate position of the predetermined block and a height of the predetermined block exceeding the picture's height;
   selecting from the available set of split modes a binary split mode comprising a vertical binary split mode or a horizontal binary split mode; and
   splitting the predetermined block according to the selected binary split mode into two subblocks along a split line that is parallel to a boundary of the picture and centered inside the predetermined block.

2. The method of claim 1, wherein based on the determined sum, the splitting of the predetermined block is not counted towards reaching a predetermined maximum number of splits.

3. The method of claim 1, further comprising:
selecting from the available set of split modes the vertical binary split mode when a boundary of the picture that is located inside the predetermined block is vertical.

4. The method of claim 1, further comprising:
selecting from the available set of split modes the horizontal binary split mode when a boundary of the picture that is located inside the predetermined block is horizontal.

5. The method of claim 1, further comprising:
determining to exclude a quad split mode from the available set of split modes based on the predetermined block not extending beyond at least one of the picture's width or the picture's height.

6. A non-transitory processor readable medium having stored thereon instructions for causing at least one processor to perform the method of claim 1.

7. A method for block-based decoding of a picture from a data stream according to a recursive multi-tree partitioning of the picture into leaf blocks, the method comprising:
determining an available set of split modes for a predetermined block, based on a split availability for a specified partitioning depth and at least one of:
a sum of an x-coordinate position of the predetermined block and a width of the predetermined block exceeding the picture's width; or
a sum of a y-coordinate position of the predetermined block and a height of the predetermined block exceeding the picture's height;
selecting from the available set of split modes a binary split mode comprising a vertical binary split mode or a horizontal binary split mode; and
splitting the predetermined block according to the selected binary split mode into two subblocks along a split line that is parallel to a boundary of the picture and centered inside the predetermined block.

8. The method of claim 7, wherein based on the determined sum, the splitting of the predetermined block is not counted towards reaching a predetermined maximum number of splits.

9. The method of claim 7, further comprising:
selecting from the available set of split modes the vertical binary split mode when the boundary of the picture that is located inside the predetermined block is vertical.

10. The method of claim 7, further comprising:
selecting from the available set of split modes the horizontal binary split mode when the boundary of the picture that is located inside the predetermined block is horizontal.

11. The method of claim 7, further comprising:
determining to exclude a quad split mode from the available set of split modes based on the predetermined block not extending beyond at least one of the picture's width or the picture's height.

12. A non-transitory processor readable medium having stored thereon instructions for causing at least one processor to perform the method of claim 7.

13. An apparatus for block-based processing of a picture according to a recursive multi-tree partitioning of the picture into leaf blocks, the apparatus comprising:
at least one processor; and
a memory having instructions which, when executed by the at least one processor, cause the apparatus to perform operations comprising:
determining an available set of split modes for a predetermined block, based on a split availability for a specified partitioning depth and at least one of:
a sum of an x-coordinate position of the predetermined block and a width of the predetermined block exceeding the picture's width; or
a sum of a y-coordinate position of the predetermined block and a height of the predetermined block exceeding the picture's height;
selecting from the available set of split modes a binary split mode comprising a vertical binary split mode or a horizontal binary split mode; and
splitting the predetermined block according to the selected binary split mode into two subblocks along a split line that is parallel to a boundary of the picture and centered inside the predetermined block.

14. The apparatus of claim 13, wherein based on the determined sum, the splitting of the predetermined block is not counted towards reaching a predetermined maximum number of splits.

15. The apparatus of claim 13, the operations further comprising:
selecting from the available set of split modes the vertical binary split mode when a boundary of the picture that is located inside the predetermined block is vertical.

16. The apparatus of claim 13, the operations further comprising:
selecting from the available set of split modes the horizontal binary split mode when a boundary of the picture that is located inside the predetermined block is horizontal.

17. The apparatus of claim 13, the operations further comprising:
determining to exclude a quad split mode from the available set of split modes based on the predetermined block not extending beyond at least one of the picture's width or the picture's height.

18. The apparatus of claim 13, wherein the apparatus comprises an encoder.

19. The apparatus of claim 13, wherein the apparatus comprises a decoder.

* * * * *